US012686804B2

(12) United States Patent
Dahi Taleghani et al.

(10) Patent No.: US 12,686,804 B2
(45) Date of Patent: Jul. 21, 2026

(54) APPARATUS UTILIZING SHAPE-MEMORY AND SELF-ASSEMBLY TO PLUG RELATIVELY WIDE REMOTE FRACTURES

(71) Applicant: The Penn State Research Foundation, University Park, PA (US)

(72) Inventors: Arash Dahi Taleghani, University Park, PA (US); Seyedeh Maryam Tabatabaei, University Park, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 0 days.

(21) Appl. No.: 18/695,840

(22) PCT Filed: Oct. 4, 2022

(86) PCT No.: PCT/US2022/045616
§ 371 (c)(1),
(2) Date: Mar. 27, 2024

(87) PCT Pub. No.: WO2023/059591
PCT Pub. Date: Apr. 13, 2023

(65) Prior Publication Data
US 2024/0392179 A1 Nov. 28, 2024

Related U.S. Application Data

(60) Provisional application No. 63/252,279, filed on Oct. 5, 2021.

(51) Int. Cl.
*C09K 8/516* (2006.01)
*C09K 8/42* (2006.01)
(Continued)

(52) U.S. Cl.
CPC .............. *C09K 8/426* (2013.01); *C09K 8/516* (2013.01); *E21B 21/003* (2013.01); *E21B 33/138* (2013.01); *F03G 7/0614* (2021.08)

(58) Field of Classification Search
None
See application file for complete search history.

(56) References Cited

U.S. PATENT DOCUMENTS

| | | | | | |
|---|---|---|---|---|---|
| 4,422,948 | A | * | 12/1983 | Corley | C09K 8/032 |
| | | | | | 507/104 |
| 8,307,916 | B1 | * | 11/2012 | Wald | C09K 8/508 |
| | | | | | 166/292 |

(Continued)

FOREIGN PATENT DOCUMENTS

CN 111303847 A 6/2020

OTHER PUBLICATIONS

International Search Report for PCT/US2022/045616 dated Feb. 2, 2023.

(Continued)

*Primary Examiner* — Andrew Sue-Ako
(74) *Attorney, Agent, or Firm* — BUCHANAN INGERSOLL & ROONEY PC

(57) ABSTRACT

Embodiments relate to a lost circulation material comprising a plurality of shape memory polymer members, each member having a temporary shape and a permanent shape. The members may be programmed to form a temporary shape that is small enough to be used with conventional drilling equipment and may further transform to corresponding permanent shapes to plug fractures. Specifically, the shape memory polymer-based lost circulation material can utilize self-assembly to plug fractures formed during drilling. Embodiments of the lost circulation material can be particularly useful for plugging large fractures. Permanent shapes present different topologies including granular, fibers, and (Continued)

Fibrous members — Temporary Configuration before activation — Permanent Configuration after activation (a) Spring-shaped (b) Disc-shaped (c) Zigzag-shaped springs (d) Spiral-shaped springs two-dimensional networks/lattices in which can mechanically interlock and form a three-dimensional plug large enough to seal large width fractures.

12 Claims, 26 Drawing Sheets

(51) Int. Cl.
_E21B 21/00_　　　(2006.01)
_E21B 33/138_　　(2006.01)
_F03G 7/06_　　　(2006.01)

(56)　　　　　　　　References Cited

U.S. PATENT DOCUMENTS

| | | | |
|---|---|---|---|
| 2008/0011472 A1* | 1/2008 | Fay | F03G 7/06145 |
| | | | 166/134 |
| 2018/0037803 A1 | 2/2018 | Dahi Taleghani et al. | |
| 2019/0023979 A1* | 1/2019 | Crews | C09K 8/80 |
| 2019/0375978 A1* | 12/2019 | Shojaei | E21B 21/002 |
| 2020/0109330 A1 | 4/2020 | Dahi Taleghani et al. | |
| 2021/0172303 A1* | 6/2021 | Musso | E21B 21/003 |

OTHER PUBLICATIONS

Written Opinion of the International Searching Authority for PCT/US2022/045616 dated Feb. 2, 2023.
Tabatabaei, M. et al., "Combination of shape-memory capability and self-assembly to plug wide remote fractures", MRS Communications, 2021, [Epub.] Nov. 23, 2021, vol. 11, pp. 770-776.

* cited by examiner

Original shape heated above T_g

Step 1 — Tension above T_g

Step 2 — Cooling down by holding mechanical loading

Step 3 — Load removal

Step 4 — Shape recovery by heating above T_g

Planar Members

Slot surface (XY-plane)

Entangled
members and
granular members
inside the slot

Slot surface

Slot surface $$S_a = 0.051\mu m$$
$$S_q = 0.068\mu m$$
$$S_z = 1.510\mu m$$

$$S_a = 0.077\mu m$$
$$S_q = 0.117\mu m$$
$$S_z = 4.125\mu m$$

$$S_a = 0.358\mu m$$

$$S_q = 0.484\mu m$$

$$S_z = 6.316\mu m$$

$$S_a = 0.454 \mu m$$
$$S_q = 0.696 \mu m$$
$$S_z = 7.174 \mu m$$

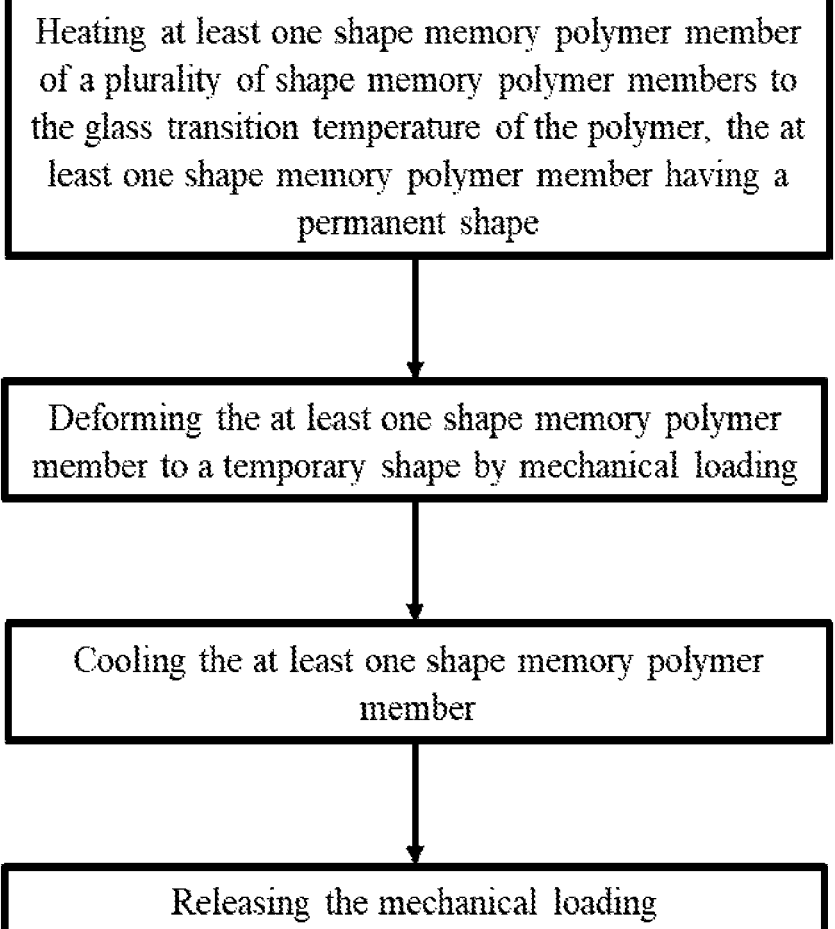

Heating at least one shape memory polymer member of a plurality of shape memory polymer members to the glass transition temperature of the polymer, the at least one shape memory polymer member having a permanent shape Deforming the at least one shape memory polymer member to a temporary shape by mechanical loading Cooling the at least one shape memory polymer member Releasing the mechanical loading

FIG. 25

APPARATUS UTILIZING SHAPE-MEMORY AND SELF-ASSEMBLY TO PLUG RELATIVELY WIDE REMOTE FRACTURES

CROSS-REFERENCE TO RELATED APPLICATIONS

This patent application is the U.S. national stage application of International Patent Application No. PCT/US2022/045616, filed on Oct. 4, 2022, which is related to and claims the benefit of U.S. provisional application 63/252,279, filed on Oct. 5, 2021, the entire contents of which is incorporated by reference.

FIELD OF THE INVENTION

Embodiments relate to a shape memory polymer-based lost circulation material and methods of use and making thereof.

BACKGROUND OF THE INVENTION

During drilling, the operating pressure should be maintained within the drilling margin to ensure the well integrity. Otherwise, the formation may be fractured, and drilling fluid can be lost. Lost circulation is defined as the total or partial loss of drilling fluids into highly permeable zones, cavernous formations, and natural or induced fractures during drilling or cementing operations. Economically speaking, about 25-40% of total drilling costs are spent on drilling fluids. In addition, lost circulation problems account for around $800 million, and the products used to prevent or remediate a lost circulation event cost over $200 million. While there have been various lost circulation materials available in the market for treating fractures during the drilling of wells, there is still a demand for a technology to plug large fractures. Considering limitations on the size of the particles that can be circulated through the drilling equipment, especially the bottom hole assembly, simply enlarging conventional lost circulation materials particles becomes ineffective for plugging large fractures. Accordingly, there is a need for technology that allows for the injection of elements that are small enough to be used with conventional drilling equipment and having the ability to enlarge after reaching the target zone (e.g., the fracture site) to form a plug via a jamming structure.

BRIEF SUMMARY OF THE INVENTION

Embodiments relate to a lost circulation material comprising a plurality of shape memory polymer members, each member having a temporary shape and a permanent shape. The members may be programmed to form a temporary shape that is small enough to be used with conventional drilling equipment and may further transform to corresponding permanent shapes to plug fractures. Specifically, the shape memory polymer-based lost circulation material can utilize self-assembly to form a bridge to plug fractures formed during drilling. Embodiments of the lost circulation material can be particularly useful for plugging large fractures.

In an exemplary embodiment, a lost circulation material comprises a plurality of shape memory polymer members, at least one shape polymer memory member having a temporary shape and a permanent shape, wherein the at least one shape memory polymer member is configured to transform from the temporary shape to the permanent shape upon stimulation by an external trigger, and wherein the plurality of shape memory polymer members comprise: at least one shape memory polymer member with a granular permanent shape; at least one shape memory polymer member with a fibrous permanent shape; and at least one shape memory polymer member with a planar permanent shape.

In some embodiments, the external trigger is a temperature above the glass transition temperature of the plurality of shape memory polymer members.

In some embodiments, the temporary shape is programmed by a thermomechanical cycle.

In some embodiments, the at least one shape memory polymer member is one or more selected from the group consisting of an ionomer of poly(ethylene-co-methacrylic acid), a thermoset polymer, and a thermoplastic.

In some embodiments, the temporary shape has at least one dimension that is smaller than at least one dimension of the permanent shape.

In some embodiments, the lost circulation material is configured to form a jamming structure when the at least one member transforms to the permanent shape, the jamming structure configured to plug a fracture having a width, wherein the width of the fracture is at least one order of magnitude larger than a dimension of the temporary shape.

In some embodiments, the temporary shape has a dimension that is 20 mm or less.

In an exemplary embodiment, a method of creating a lost circulation material comprises heating at least one shape memory polymer member of a plurality of shape memory polymer members to the glass transition temperature of the polymer, the at least one shape memory polymer member having a permanent shape; deforming the at least one shape memory polymer member to a temporary shape by mechanical loading; cooling the at least one shape memory polymer member; and releasing the mechanical loading, wherein the plurality of shape memory polymer members comprise: at least one shape memory polymer member with a granular permanent shape; at least one shape memory polymer member with a fibrous permanent shape; and at least one shape memory polymer member with a planar permanent shape.

In some embodiments, the method further comprises heating the at least one shape memory polymer member to recover the permanent shape.

In some embodiments, the mechanical loading is selected from the group consisting of rolling, spinning, folding, compressing, or providing tension.

In some embodiments, deforming the at least one shape memory polymer member to a temporary shape comprises multi-step programming.

In some embodiments, the at least one shape memory polymer member is one or more selected from the group consisting of an ionomer of poly(ethylene-co-methacrylic acid), a thermoset polymer, and a thermoplastic.

In some embodiments, the temporary shape has at least one dimension that is smaller than at least one dimension of the permanent shape.

In some embodiments, the lost circulation material is configured to form a jamming structure when the at least one member transforms to the permanent shape, the jamming structure configured to plug a fracture having a width, wherein the width of the fracture is at least one order of magnitude larger than a dimension of the temporary shape.

In some embodiments, the temporary shape has a dimension that is 20 mm or less.

In an exemplary embodiments, a method of plugging a large width fracture comprises directing a lost circulation material to the fracture at a fracture site, wherein the lost circulation material comprises a plurality of shape memory polymer members, at least one shape memory polymer member embodying a temporary shape, wherein the at least one shape memory polymer member is configured to transform from the temporary shape to a permanent shape upon stimulation by an external trigger, and wherein the plurality of shape memory polymer members is configured to form a plug at the fracture, and wherein the plurality of shape memory polymer members comprise: at least one shape memory polymer member with a granular permanent shape; at least one shape memory polymer member with a fibrous permanent shape; and at least one shape memory polymer member with a planar permanent shape.

In some embodiments, the external trigger is a temperature of, at, near, or around the fracture site.

In some embodiments, a dimension of the large width fracture is at least one order of magnitude larger than a dimension of the temporary shape.

In some embodiments, the temporary shape has a dimension that is 20 mm or less.

In some embodiments, the method further comprises forming a plug at the fracture, wherein the at least one shape memory polymer member with a planar permanent shape may bridge the fracture and trap the at least one shape memory polymer member with a fibrous permanent shape and the at least one shape memory polymer member with a granular permanent shape.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages, and possible applications of the present invention will be more apparent from the following more particular description thereof, presented in conjunction with the following drawings. It should be understood that like reference numbers used in the drawings may identify like components.

FIG. 25 shows a flow chart detailing an exemplary embodiment of a method of creating a lost circulation material.

DETAILED DESCRIPTION OF THE INVENTION

Figure 1:
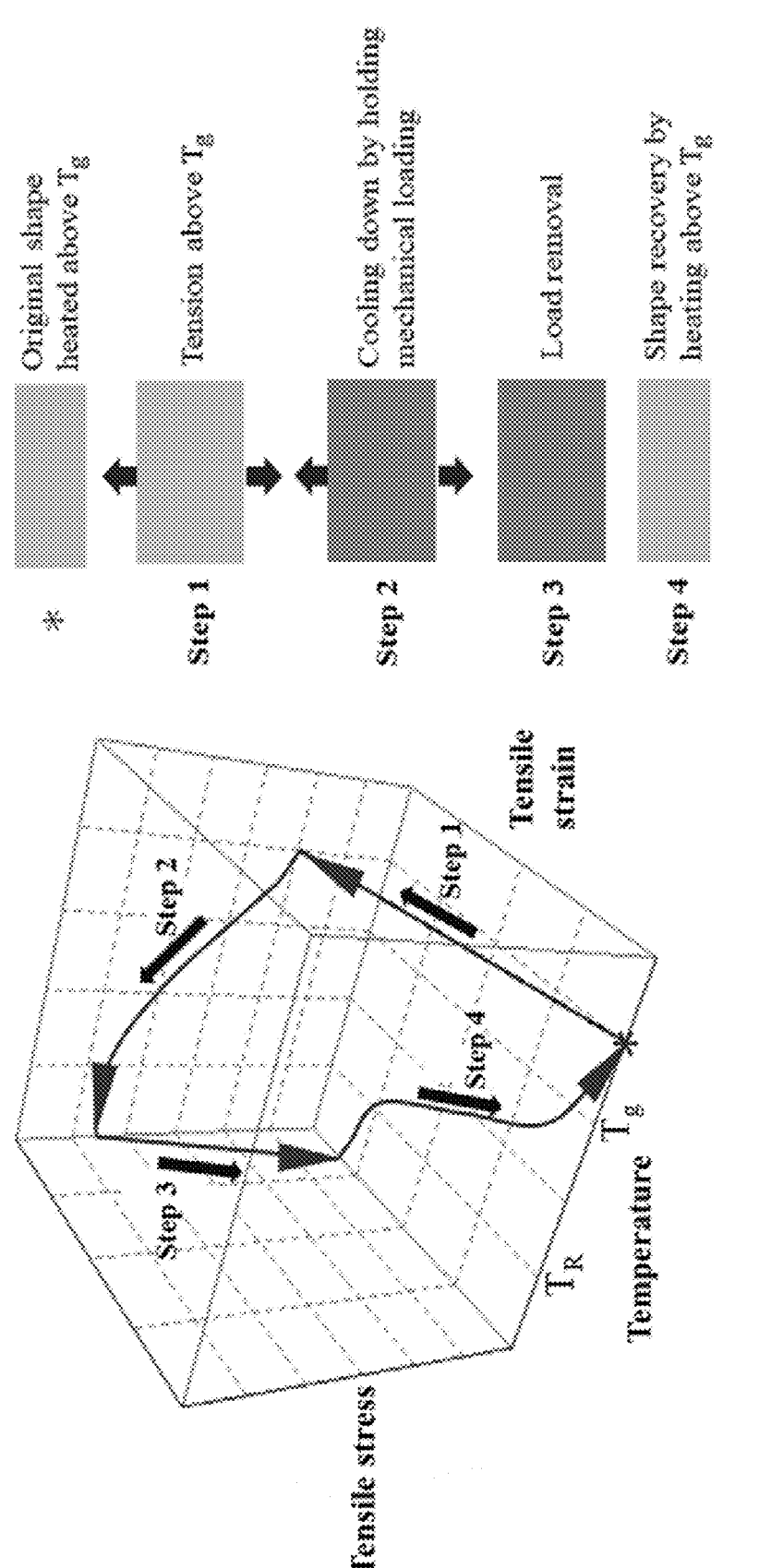
FIG. 1 shows a schematic representation of common thermomechanical programming steps.

The following description is of an embodiment presently contemplated for carrying out the present invention. This description is not to be taken in a limiting sense but is made merely for the purpose of describing the general principles and features of the present invention. The scope of the present invention should be determined with reference to the claims.

Shape memory materials, such as shape memory polymers, are known for their ability to transform from a temporary shape to a permanent shape (e.g., from a smaller temporary shape to a larger permanent shape). These materials can be programmed to temporarily form a temporary shape which can later convert back to their permanent shape as needed or stimulated by an external trigger. In drilling applications, shape memory polymers can provide for an advantageous alternative over conventional lost circulation materials. There is a demand for a technology to plug large fractures, and considering limitations on the size of the particles that can be circulated through drilling equipment, enlarging conventional lost circulation materials is ineffective for plugging large fractures. In particular, the demand exists in at least the following drilling applications: oil and gas, geothermal, nuclear waste disposal, and carbon dioxide storage. Accordingly, shape memory polymers may be used to create shape memory polymer-based lost circulation materials programmed with various temporary shapes that are small enough to be used with conventional drilling equipment, but may further transform to corresponding permanent shapes to plug large fractures.

Specifically, the shape memory polymer-based lost circulation materials can utilize self-assembly—the idea that individual separate units (e.g., individual shape memory polymer members) may come together to form a more precise larger structure—to plug large fractures. In a self-assembly process, individual units move with respect to each other to balance their positions based on the interaction forces. Therefore, this process usually happens in a fluid phase.

Embodiments relate to a lost circulation material (LCM) comprising a plurality of shape memory polymer (SMP) members. It is contemplated that at least one SMP member may have a temporary shape and a permanent shape, wherein the SMP member embodies its temporary shape when the SMP member is in an inactivated state and the SMP member embodies its permanent shape when the SMP member is in an activated state. For instance, the LCM can comprise a plurality of SMP members, wherein each SMP member has a temporary shape and a permanent shape, or a portion (e.g., 10%, 20%, 40%, 50%, 60%, etc. of the plurality) has a temporary shape and a permanent shape and the other portion has a permanent shape, etc. Some embodiments of the LCM can have a first plurality of SMP members and a second plurality of SMP members. The first plurality of SMP members can have a temporary-permanent portion to permanent portion ratio that differs from the temporary-permanent portion to permanent portion ratio of the second plurality of SMP members. Some embodiments of the LCM can have one or more type of SMP members. For instance, the LCM can comprise a plurality of SMP members, wherein each SMP member is of a first type, or a portion (e.g., 10%, 20%, 40%, 50%, 60%, etc. of the plurality) comprises a first type and the other portion comprises a second type, etc. Some embodiments of the LCM can have a first plurality of SMP members and a second plurality of SMP members.

It is contemplated that the SMP member may transform from its temporary shape (e.g., inactivated state) to its permanent shape (e.g., activated state) upon stimulation by an external trigger. The external trigger can be a condition experienced by the SMP member. The external trigger condition can be the SMP member being subjected to a temperature (e.g., a threshold temperature, a change in temperature, etc.), a pressure (e.g., a threshold pressure, a change in pressure, etc.), radiation (e.g., a threshold amount or intensity of radiation, a change in amount or intensity of radiation, etc.), magnetic energy (e.g., a threshold magnetic field or magnetic flux, a change in magnetic field or magnetic flux, etc.), etc. In exemplary embodiments, the external trigger is a temperature above the glass transition temperature of the SMP member. Being subjected to can include being exposed to directly or indirectly, being applied to directly or indirectly, being in proximity to, being influenced by, etc. The transformation may occur upon the occurrence of the trigger condition, may commence upon the occurrence of the trigger condition (e.g., the transformation may not complete unless the trigger condition occurs for a predetermined duration, or the transformation may not complete unless another trigger occurs, etc.), etc. It is understood that the SMP member may have one or more trigger conditions. One trigger condition can cause the same transformation as another trigger condition, or one trigger condition may cause a transformation that differs from another transformation. One trigger condition may cause a transformation of an SMP member at a first rate, whereas another trigger condition may case the same transformation of the SMP member at a second rate.

Figure 2:
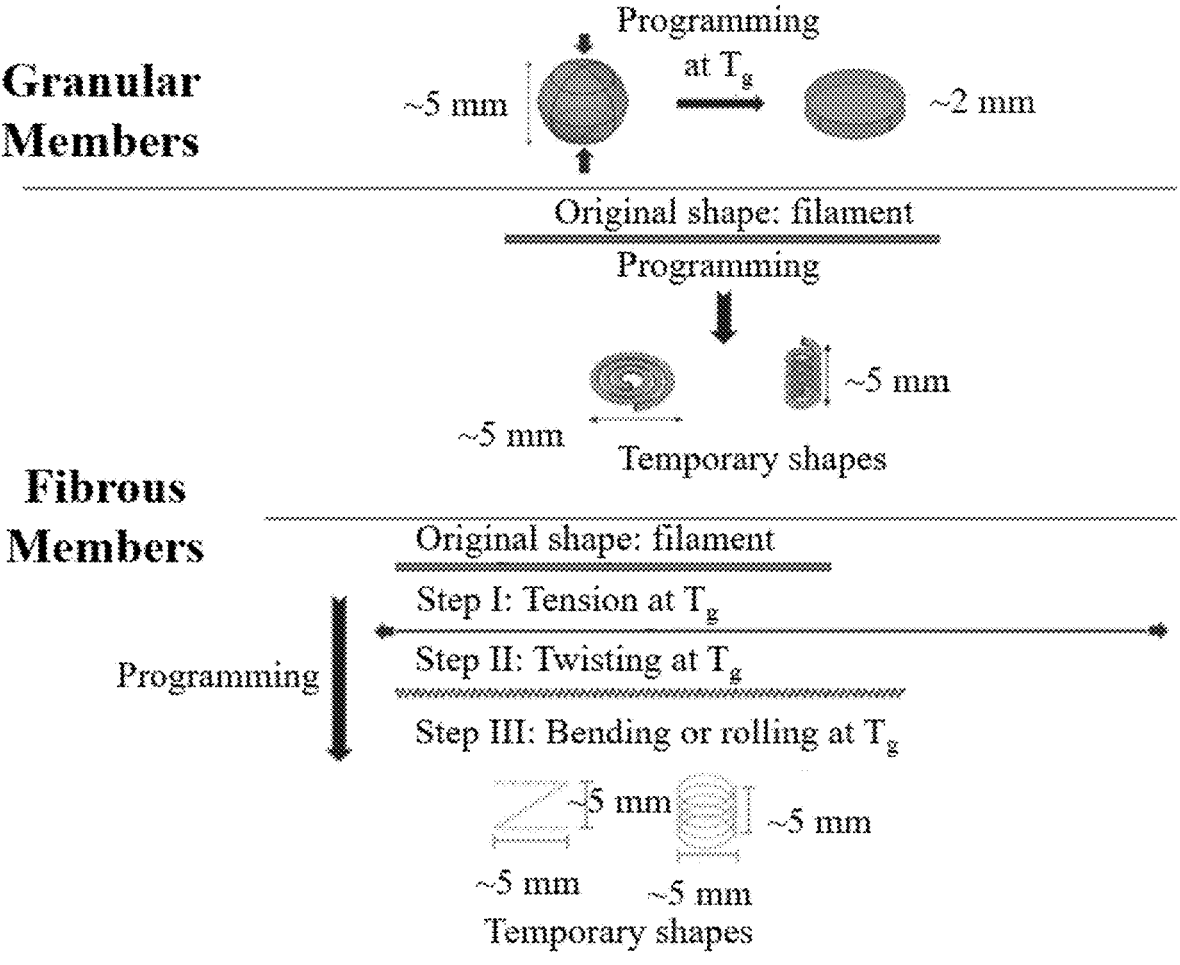
FIG. 2 shows a schematic representation of thermomechanical programming on granular members and fibrous members.

The plurality of SMP members may comprise at least one member with a granular permanent shape such that upon stimulation by an external trigger, it transforms from its temporary shape to the granular permanent shape (see FIG. 2). Granular is understood to mean resembling small grains or particles. For instance, the granular permanent shape may be spherical or substantially spherical and have a diameter. The granular permanent shape may have a diameter of 20 mm or, or 5 mm or less. It is contemplated that the temporary shape corresponding to the granular permanent shape may be a flattened or compressed shape (e.g., a disc shape). The flattened or compressed shape can have a thickness. The thickness of the temporary shape can be 5 mm or less, or 2 mm or less. For instance, the SMP member can have a temporary shape that is flattened or compressed, and when subjected to an external trigger condition it transforms into its granular permanent shape that is spherical or substantially spherical.

The plurality of SMP members may comprise at least one member with a fibrous permanent shape such that upon stimulation by an external trigger, it transforms from its temporary shape to the fibrous permanent shape (see FIG. 2). Fibrous is understood to mean resembling a fiber or fiber-like structure. The fibrous permanent shape includes a tubular shape, a billet shape, a bar shape, etc. and has a diameter and a length. The fibrous permanent shape may have a diameter of 0.3-1 mm or less and a length of 30-100 mm. It is contemplated that the temporary shape of the fibrous permanent shape may be a shape such as, but not limited to, a disc, a spring, a zigzag-shaped spring, a spiral-shaped spring, or any other suitable shape (see FIG. 5). For instance, the temporary shape of the fibrous may be a disc shape or a spring shape, and the spring shape may be further programmed (e.g., multi-step programming) to form a zigzag-shaped spring or a spiral-shaped spring. It is contemplated that the temporary shape of the fibrous permanent shape may have a length of 5-7 mm. For instance, the SMP member can have a temporary shape that is a spring shape, and when subjected to an external trigger condition it transforms into its fibrous permanent shape. This transformation can involve the spring-like member expanding into a curved fibrous member. It is contemplated that the curved fibrous members may be more effective in the formation of a self-assembled plug. As explained below (see e.g., [0113] and FIG. 24), it can be concluded that the fractal dimension of all fibrous members provided via the current thermomechanical processes of programming corresponds to 1.51 which is greater than 1. In other words, due to the process of programming and formation of curved filaments after activation, activated fibers present higher fractal dimension, which is more effective in the self-assemblage of particles and formation of jammed structures.

In the multi-step programming described above (e.g., forming a zigzag-shaped spring or a spiral-shaped spring, it is contemplated that a textured surface (wrinkles, saw tooth irregularities) develops on the members that increases their surface frictions. Enhanced surface frictions can accommodate/accelerate bridging of particles and enhance the mechanical interlocking of the members, which may result in the generation of a netted blanket in collaboration with SMP members with a planar permanent shape. The formation of netted blanket makes it possible to bridge the opening of large width fractures. On the other hand, it provides a mechanism to trap the SMP members with a granular permanent shape. The bridging and/or netted blanket may sustain high differential pressures in comparison to other methods.

Any of the SMP members can have a shape associated with the method of programming, e.g., combination of twisting, bending, and/or tensioning.

Figure 3:
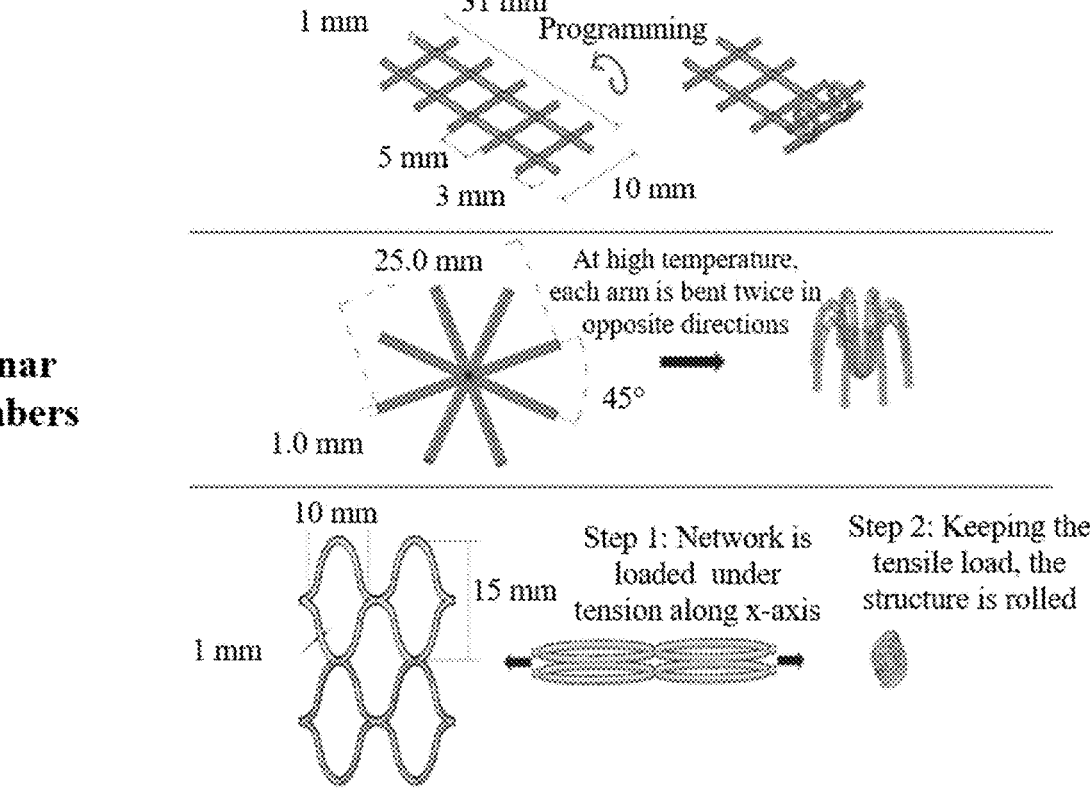
FIG. 3 shows a schematic representation of thermomechanical programming on planar members.

The plurality of SMP members may comprise at least one member with a planar permanent shape such that upon stimulation by an external trigger condition, it transforms from its temporary shape to the planar permanent shape (see FIG. 3). Planar is understood to mean resembling a structure that is two-dimensional in quality. The planar permanent shape may be a shape such as, but not limited to, a ladder, a star, a lattice, or any other suitable shape (see FIGS. 3 and 5). The planar permanent shape may have a length. The planar permanent shape may have a length of 15-40 mm.

Each planar permanent shape may correspond to a specific temporary shape. For instance, the temporary shape of the ladder permanent shape can be a rolled ladder structure (e.g., rolled along its width), the temporary shape of the star permanent shape can be a spider-like shape (e.g., each arm of the star is bent twice in opposite directions such that the temporary shape resembles a spider), and the temporary shape of the lattice permanent shape can be a spindle-like shape (e.g., the lattice is pulled and subsequently rolled into the shape of a spindle) (see FIGS. 3 and 5). It is contemplated that the temporary shape of the planar permanent shape may have a length of 10-17 mm. It is further contemplated that each arm of the star permanent shape has a length of 12.5 mm.

In exemplary embodiments, the SMIP is one or more of an ionomer of poly(ethylene-co-methacrylic acid), a thermosetting polymer, or thermoplastic, or any other suitable SMP. For glass transition temperatures less than 100° C., the SMP may be poly(ethylene-co-methacrylic acid), polyurethane, epoxy, polyolefin, partially dehydrochlorinated poly (vinyl chloride), nylon/polyethylene graft copolymers, or any other suitable SMP and mixtures thereof. For glass transition temperatures greater than 100° C., the SMP may be polyimides, polyether ether ketone, cyanate esters, poly (ethersulfone), poly(decamethylene terephthalamide), or any other suitable SMP and mixtures thereof.

In exemplary embodiments, the external trigger is a high temperature. For instance, the SMP member may transform from its temporary shape to its permanent shape upon the SMP member being exposed to a high temperature. It is contemplated that the high temperature corresponds to the temperature of bottom hole assembly (e.g., where a fracture may occur) such that as the plurality of SMPs reach or substantially reach a fracture site, the members transform from their temporary shapes to their larger permanent shapes. It is contemplated that the external trigger is a temperature greater than the glass transition temperature of the SMP. It is understood that the temperature is dependent on the glass transition temperature of the SMP. It is contemplated that by selecting SMPs with higher glass transition temperatures, the concept will work at higher temperatures, and by selecting SMPs with lower glass transition temperatures, the concept will work at lower temperatures. It is contemplated that the external trigger releases energy stored inside the SMP member in its inactivated state to trigger the activated state and recover its permanent shape.

In exemplary embodiments, the temporary shape of any one or combination of SMP members of the LCM is programmed by a thermomechanical cycle. Thermomechanical cycling programming is a thermomechanical functionalization process by an external physical manipulation in controlled temperatures. For example, different temporary shapes can be thermomechanically programmed such that the SMP member embodies the programmed temporary shape when the SMP member is in an inactivated state. It is contemplated that the programming is done at a temperature above the glass transition temperature ($T_g$) of the SMP.

Embodiments further relate to a method of creating an LCM. The LCM can comprise a plurality of SMP members. Each SMP member can be programmed via thermomechanical cycle processing or other suitable processing. For instance, each SMP can be programmed by physically manipulating the SMP at controlled temperatures. For example, programming may be a thermomechanical process to fix SMPs in a temporary shape which can be transformed to its permanent shape by an external trigger according to the programming process. Specifically, the shape memory functionality of a SMP may be achieved by exposing the SMP to a cycle of heating, mechanical loading, cooling, and removal of load (e.g., a thermomechanical cycle).

In exemplary embodiments, the method of creating a LCM comprises (1) providing a plurality of SMP members having a permanent shape; (2) heating the SMP members to a critical temperature (e.g., one of the glass transition points); (3) deforming the SMP members to a temporary shape by mechanical loading; (4) cooling the SMP members; and (5) releasing the mechanical loading. As noted herein, the LCM can comprise of: one or more SMP member types, one or more pluralities of SMP members, etc. The method steps for each type of SMP member and each plurality can be similar to steps (1)-(5) discussed above.

With embodiments related to the external trigger condition being high temperature, the shape recovery functionality of the SMP members can be achieved by increasing the temperature of the SMP members to a critical temperature. The critical temperature can depend on the type of SMIP material used, type of programming used, operating parameters of the programming used, etc. It is further contemplated that the critical temperature may be a temperature above the $T_g$ of the SMP member.

In exemplary embodiments, it is contemplated that deforming the SMP member may comprise a mechanical loading such as, but not limited to, rolling, spinning, folding, compressing, providing tension, or any other suitable deformation. It is contemplated that the loading may depend on the permanent shape of the SMP member and/or the temporary shape of the SMP member. For example, regarding the granular permanent shape, the deformation may comprise compression such that a flattened or compressed temporary shape is formed. For example, regarding the fibrous permanent shape, the deformation may comprise spinning such that a temporary disc shape is formed, spinning around a wire (e.g., a copper wire) such that a temporary spring shape is formed, or folding the spring shape such that the temporary zigzag-shaped spring or temporary spiral-shaped spring is formed. For example, regarding the planar permanent shape, the deformation may comprise rolling the permanent ladder shape (e.g., along its width) such that a temporary rolled ladder shape is formed, folding the arms of the permanent star shape (e.g., folding each arm twice in opposite directions) such that a temporary spider shape is formed, or providing tension to the permanent lattice shape and rolling the tensioned lattice shape such that a temporary spindle shape is formed.

It is contemplated that, after the deforming of the SMP member from its permanent shape to its temporary shape, the temporary shape is smaller than the permanent shape. In drilling applications, this is advantageous as smaller temporary shapes enable the SMP members to satisfy the size limitations of drilling equipment, while still allowing the SMP members to recover their larger permanent shape after they are activated by high temperatures at or near the fracture site. It is contemplated that the temporary shape may have a dimension that is 20 mm or less, 15 mm or less, or 5 mm or less.

Embodiments further relate to a method of plugging a large width fracture. It is contemplated that the large width fracture For example, it is contemplated that the large width fractures may be at least 15 mm wide, at least 100 mm wide, etc. It is contemplated that SMP-based LCMs can utilize self-assembly—the idea that individual separate units (e.g., individual shape memory polymer members) may come together to form a more precise larger structure—to plug large width fractures. In a self-assembly process, individual units move with respect to each other to balance their positions based on the interaction forces. Therefore, this process usually happens in a fluid phase. In drilling applications, self-assembly may be used to plug remote fractures that are difficult or impossible to access by available technology, such as cracks in underground formation rocks.

In exemplary embodiments, the method of plugging a large width fracture comprises (1) providing a LCM, and (2) directing the LCM to the fracture at a fracture site, wherein the LCM comprises a plurality of SMP members, each member embodying a temporary shape. It is contemplated that the members are configured to transform from the temporary shape to a permanent shape upon stimulation by an external trigger. The providing of the LCM can include fabricating the LCM, obtaining the LCM, supplying the LCM, etc. Directing the LCM to the fracture can involve introducing the LCM into the wellbore in a fluid or sludge type solution so that it travels to the fracture site, introducing the LCM in fluid of sludge type solution to the fracture site via a hose connected to a pump, etc. After being directed to the fracture site, the LCM can be caused to deposit or allowed to deposit on the structure (e.g., pipe, wellbore, etc.) that is fractured. The external trigger can be a condition that occurs passively (e.g., the LCM is kept as a relatively cool temperature and delivered while still at this cool temperature and when deposited at the fracture site ambient temperature causes the trigger condition) or actively (e.g., after being deposited at the fracture site, a user can apply heat to increase the temperature and trigger the condition).

It is contemplated that, upon transforming to their respective permanent shapes, the members are configured to form a plug at the fracture via self-assembly. For example, the design of the LCM may help the SMP members to mechanically interlock and form a plug or a jamming structure across the fracture opening.

It is contemplated that, to plug the opening of large width fractures, it is first required to make bridging over the fracture. In exemplary embodiments, the plurality of SMP members may comprise at least one member with a granular permanent shape, at least one member with a fibrous permanent shape, and at least one SMP member with a planar permanent shape. In this embodiment, members with a planar permanent shape may provide a bridging over the structure to allow for the settlement of SMP members with a fibrous permanent shape and SMP members with a granular permanent shape, therefore resulting in a plug. In an alternative embodiment, SMP members with a planar permanent shape and SMP members with a fibrous permanent shape may work together to form an entangled network and provide a bridging to trap SMP members with a granular permanent shape, therefore resulting in a plug. It is contemplated that the entanglement and friction between members may be important factors determining the strength of the plug against washing away. The bridging may sustain high differential pressures in comparison to other methods. The plug and/or the bridging may occur at the mouth of the fracture, at the tip of the fracture, and or at the middle of the fracture.

It is contemplated that the external trigger is the temperature of the fracture site, such that as the plurality of SMPs reach or substantially reach a fracture site, the SMP members transform from their temporary shapes to their larger permanent shapes. It is contemplated that the external trigger releases energy stored inside the SMP member in its inactivated state to trigger the activated state and recover its permanent shape.

It is contemplated that a liquid mixture may comprise the plurality of SMP members. For example, the liquid mixture may be a liquid mud, such that the liquid mud may comprise the plurality of SMP members to pump the SMIP members into downhole. In exemplary embodiments, the LCM is 5% by volume SMP members, 10% by volume SMP members, 15% by volume SMP members, etc.

In exemplary embodiments, the SMP members may comprise saw tooth irregularities on its surface. It is contemplated that the presence of saw tooth irregularities enhances the mechanical interlocking and results in the generation of a netted blanket in collaboration with members with planar permanent shapes.

EXAMPLES

Exemplary embodiments of the SMP-based LCM and test results are presented below.

Example 1

Jammed architectural systems and self-assembly strategy are novel fields of research toward new routes of material fabrication. In both approaches, building blocks are assembled, manually/digitally in the former case or self-assembly in the latter case. Jamming materials are structurally disordered, presenting an amorphous solid. However, self-assembly can result in structurally ordered/disordered materials. A self-assembly process may be used to build a jamming material which is structurally disordered. The purpose of the jamming material can be to plug remote fractures with large widths which are difficult or impossible to access by available equipment, such as cracks in underground formation rocks. In the following, similarities and discrepancies of above-mentioned approaches are discussed. A smart polymer that can be used to fabricate individual components is also presented.

Jamming materials can be defined as large conglomerations of discrete macro-scale particles are fabricated through controlled aggregation of granular particles [1-4]. The conglomerated material is structurally disordered, presenting an amorphous solid. It has been determined that one of the important challenges of these materials is to find the most effective way to pack granular constituent particles. These architectural materials offer the capacity to design a macro-level material behavior through its constituent particles. Rather than designing a static object with permanently placed elements, the morphology of ingredient particles, granular consistency, pouring, and bounding conditions calibrate the cumulative behavior. The group of Gramazio Kohler Research at ETH Zurich and the Self-Assembly Lab at Massachusetts Institute of Technology investigated and developed automatic fabrication of jamming architectural structures from aggregation of low-grade building materials [5]. One of the approaches they investigated for the fabrication of jamming material system was layering granular materials with flat two-dimensional objects like geotextiles. They also used one-dimensional chains to reinforce the system against buckling.

In self-assembly process, components move with respect to each other to balance their positions based on the interaction forces. Therefore, this process usually happens in a fluid phase or on a smooth surface, allowing components to be mobile. It is an organization process of assembling individual components into patterns or structures without human intervention [6]. Although the strength of self-assembly is recognized in micro- and nano-fabrication, it is a strategy that can be applied at all scales, for example, in the self-assembly of meso- or macroscopic components [7, 8]. Zhang et al. [9] built self-assembled architectures with centimeter length scales by the self-folding of smart polymer three-dimensional (3D) geometries. Lin et al. [10] fabricated large-sized open-cell cellular materials by the self-assembly of one-dimensional (1D) microfibers. At the molecular scale, it is non-covalent or weak covalent interactions which results in self-assembled structures, however, for larger objects, other interactions which are not important at the nanoscale are involved. At meso- or macro-scale, interactions such as gravitational, electrostatic, magnetic, hydrodynamic, fluid shear, hydrophobic, and capillary forces, can be selected and tailored. Characteristics of individual components, such as, shape, surface properties, mass, charge, polarizability, and magnetic dipole, can be utilized to help organize them into desirable patterns and functionalities.

Bowden et al. [7] and Boncheva et al. [8] described the role of capillary interactions in self-assembling functional systems at meso- and millimeter-scales. They discussed the capabilities of meso-scale self-assembly in leading to new routes for the assembly of electrical components, membranes, and microelectromechanical systems (MEMS). They believed that self-assembly has a potential to become a valuable strategy for the fabrication of functional structures [8]. However, the fabrication of appropriately functionalized components was discussed as the biggest obstacle in front of the wide use of self-assembly [8]. Considering that shape memory polymers (SMPs) allow the application of bulky components in a compressed shape [11-17], it is scientifically interesting to combine the shape-memory capability of smart polymers and the self-assembly strategy for the fabrication of small and functionalized individual components.

Shape memory materials are mostly determined by their shape transformation from a temporary to the permanent shape (one-way transformation) [15, 16] or by reversibly switching between the temporary and permanent shapes without subsequent programming (two-way transformation) [18, 19]. In fact, these materials can be externally programmed to temporarily form a specific shape which can later convert back to their permanent shape as needed or stimulated by an external trigger. The external trigger can be temperature, microwave, or electricity current and is required to release the energy stored inside the material to recover its permanent shape. Programming is a thermomechanical functionalization process by an external physical manipulation in controlled temperatures. A classical one-way shape memory functionality is achieved by exposing the polymer to a cycle of heating, mechanical loading, cooling, and removal of load. FIG. 1 shows a typical thermomechanical cycle of a compression programming. Programing starts at a temperature above the glass transition temperature, $T_g$ of the SMP, at which it shows high flexibility, and usually leads to higher shape fixity. In other words, above $T_g$, SMP behaves soft and rubbery, which can be easily deformed. However, when the programming temperature is about 20° C. lower than $T_g$, the shape fixity starts to drop dramatically, where the SMP behaves glassy and stiff. After cooling down and removing mechanical constraints, SMP may largely keep the deformed shape, suggesting good shape fixity ratio, or partially keep the deformed shape, suggesting poor shape fixity ability. SMPs with thermal triggers can be either thermoplastic or thermoset. Thermoplastic polymers when deformed under an external force at the melting temperature, the mobile molecules align along the loading direction. Because of that, the entropy reduces, and later can be recovered driven by increase in entropy. Thermoset polymers consist of polymer chains with a certain number of cross-links [14, 20-21]. Cross-links are net points where the elastic energy and, consequently, the memory of the permanent shape is stored. Polymer chains, between net points, are switching segments that can be stretched along the loading direction at the temperatures above the glass transition temperature. Subsequently, cooling down the deformed material, polymer chains lose their mobility, which stabilizes the temporary shape of the polymer. In addition to using reduced entropy as a driving force, enthalpy that is stored in the chemical bonds can become a strong driving force for stress recovery of thermoset shape memory polymers [16]. Some of the applications in which SMPs are self-deployed are solar array [22], self-disassembly of electronic products [23], self-healing [24], and intelligent medical devices [11, 25].

It has been determined that an ionomer composed of poly (ethylene-co-methacrylic acid), Surlyn 8940, can be used as the shape memory polymer for some embodiments. This smart polymer can stand between the thermoset and thermoplastic shape memory materials [26]. Different morphologies can be thermomechanically programmed to present granular members, fibrous members, and planar members after recovery at a high temperature above the glass transition temperature. In the following, all the above-mentioned morphologies (granular, fibrous, and planar members) are placed under the terminology of plugging materials (PMs). A drawing is given in FIGS. 2 and 3 to schematically present the original shape of fabricated (granular, fibrous, and planar) members and their programmed morphologies.

This example is organized as follows. First, the structure and programming steps of granular, fibrous, and planar members described. The design of the structure of so-called plugging materials be designed to help them mechanically interlock and form a plugging network or a jamming structure after recovery. The next step is providing evidence that the jamming structure forms a seal in the present work. To this end, the efficiency of developed members in sealing large fractures is investigated by running fracture plugging tests (FPTs). These tests measure the pressure buildup formed inside the cell. Obtaining pressure buildup is evidence of the formation of a jamming structure across the fracture opening. The reason is that the pressure buildup is achieved when discrete particles and elements (plugging materials) are mechanically interlocked and form an agglomerated/jamming structure across the fracture. As a result of that, sealing happens which results in an impermeable plug and raises the fluid pressure inside the cell. For the sake of illustration, conditions in which an opening in the wellbore or a fracture in the wellbore is sealed by the jamming structure is schematically presented in FIG. 4. The example is then followed by studying the mechanism of plug assembly, and how the surface properties of fibrous members involve in forming a network and trapping granular particles.

DuPont Surlyn 8940 polymer was used to fabricate members in various geometries. The employed polymer is an ionomer of ethylene acid copolymer with the density of 0.950 g/cm^3 and the melting temperature of 93.9° C. Lu and Li [26] and Dolog and Weiss [27] conducted differential scanning calorimeter studies to characterize the glass transition temperature ($T_g$) of ionomer poly(ethylene-co-methacrylic acid), DuPont Surlyn 8940 and DuPont Surlyn 9520, respectively. Lu and Li [26] tested two heating and cooling cycles and detected the $T_g$ of 53.1° C. in the second heating cycle. Dolog and Weiss [27] reported $T_g$ is between 5° and 55° C. For one-way shape memory materials, the shape memory effect can be quantified by two characteristic quantities, shape recovery, R and shape fixity, F. The shape recovery quantity indicates the effectiveness of the recovery process using Eq. (1)

$$R = \frac{\varepsilon_f - \varepsilon_f}{\varepsilon_f} \times 100\%, \qquad (1)$$

and the quantity of shape fixity determines the programming efficiency by Eq. (2)

$$F = \frac{\varepsilon_f}{\varepsilon_s} \times 100\%, \qquad (2)$$

in which, $\varepsilon_s$ is the maximum strain under mechanical loading of sample, $\varepsilon_f$ is the strain of the fixed temporary shape after cooling and load removal, and $\varepsilon_r$ is the residual strain of the sample after recovery to the permanent shape. For a material with an ideal shape memory effect, F=R=100%. Lu and Li [26] calculated F and R on the basis of first heating and cooling cycle. The sample was programmed and recovered at the temperature of 65° C., and the tensile stress for programming was 1.25 MPa. They obtained values of F=89.3% and R=59.6% [26].

Materials were used as received to program granular members. To fabricate fibrous members and planar members, the extrusion process at the temperature around 200° C. was used to prepare filaments with 0.8 mm diameter. Then, the filaments were used to program fibrous members and to configure and planar members. The process of programming was performed at the temperature of 70° C., about 20° C. above T$_g$.

Programming is a thermomechanical process to fix SMPs in a temporary shape which can be transformed to its permanent shape by an external trigger according to the programming process. One can benefit from the process of programming to first prepare granular, fibrous, and planar members with small temporary shapes, enabling them to satisfy size limitations. Then, they activate and recover their permanent shape by exposing to the high temperature.

As the first step of programming, granular members as well as fibrous and planar members were heated up to 70° C. The second step was followed by deforming the elements, such as, rolling, spinning, folding, compression and tension. More details are provided below regarding the second step. The third step was cooling down the temperature of deformed configurations, while keeping the boundary conditions fixed. In the last step, the boundary conditions were released (removal of load). According to the programming process mentioned above, the shape recovery will be achieved by increasing the temperature of deformed membersup to 70° C.

To program filler granular members, Surlyn 8940 polymer in its original pellet form, as received, was loaded under 100 psi compression using hot plates with the temperature about 70° C. By keeping the compression loading, the plates were allowed to cool down to room temperature and, then, load was removed. Subsequently, granular members with the average planar sizes of 2-4 mm and the thickness of 1-1.5 mm were programmed.

Filaments with different diameters were configured to obtain fibrous structures upon recovery. Spring- and disc-shaped setups were prepared by spinning filaments with 0.8 mm diameter. Note that deformation of filaments into any desirable configuration occurs at the temperature of 70° C., above the glass transition temperature of Surlyn 8940, which, as mentioned, is the second step of programming. Spring-shaped structures possess the internal diameter of 0.5 mm and the length of 5 mm, and disc-shaped ones have the external diameter of 5 mm. Spiral- and zigzag-shaped springs were also programmed to fabricate fibrous members after activation. To this end, filaments of 0.8 mm diameter were first loaded under tenstion at the temperature above T$_g$ to obtain filaments with the diameter of 0.3 mm. Then, 0.3 mm diameter filaments were spun around a copper wire with the diameter of 0.5 mm to make springs. Subsequently, springs were folded to shape zigzag structures or spun to form spirals.

Figure 5:
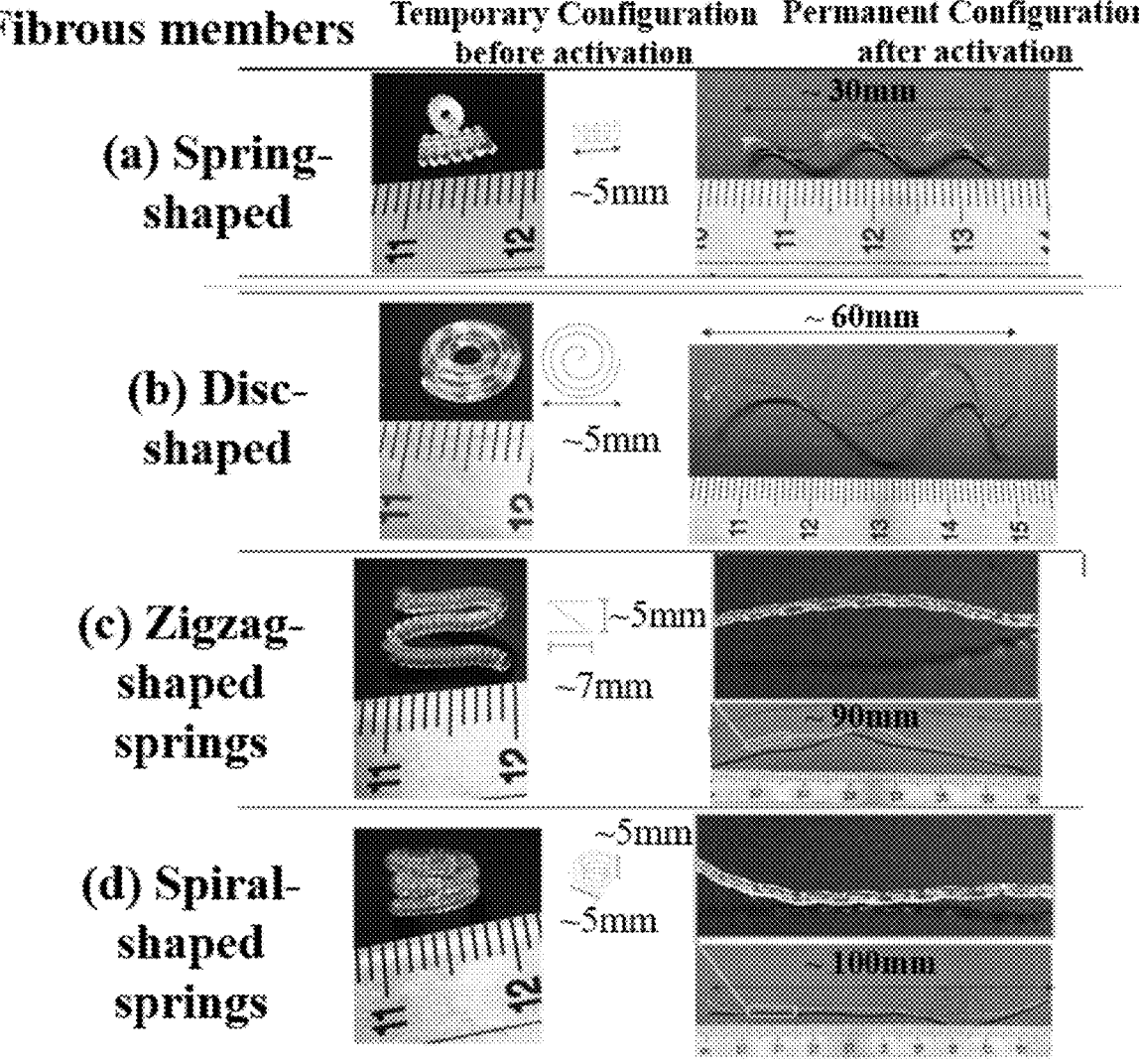
FIG. 5 shows fibrous members in their respective temporary and permanent shapes.

FIG. 5 shows the temporary and permanent configurations of spring- and disc-shaped structures as well as zigzag- and spiral-shaped springs. For more effective comparison, the length of activated fibers has also been included in the figures given in FIG. 5. It is concluded that the developed processes of programming result in significant length reduction of fibers; for example, this length reduction is about 600% for the cases of spring-shaped configuration and 2000% for the cases of spiral-shaped springs.

In summary, four different temporary shapes (springs and discs as well as zigzag- and spiral-shaped springs) were programmed under different thermomechanical steps to present fibrous members after activation. It helps us to examine the effect of different thermomechanical processes on the strength of the jamming structure against pressure. The reason is that different thermomechanical steps generate different surface profiles for the activated fibers, determining the friction forces between discrete members and, consequently, mechanical interlocking. The length of fibrous members given in FIG. 5 (30 mm, 60 mm, 90 mm, and 100 mm) is an average length of permanent shapes (after activation) corresponding to each temporary shape.

Figure 6:
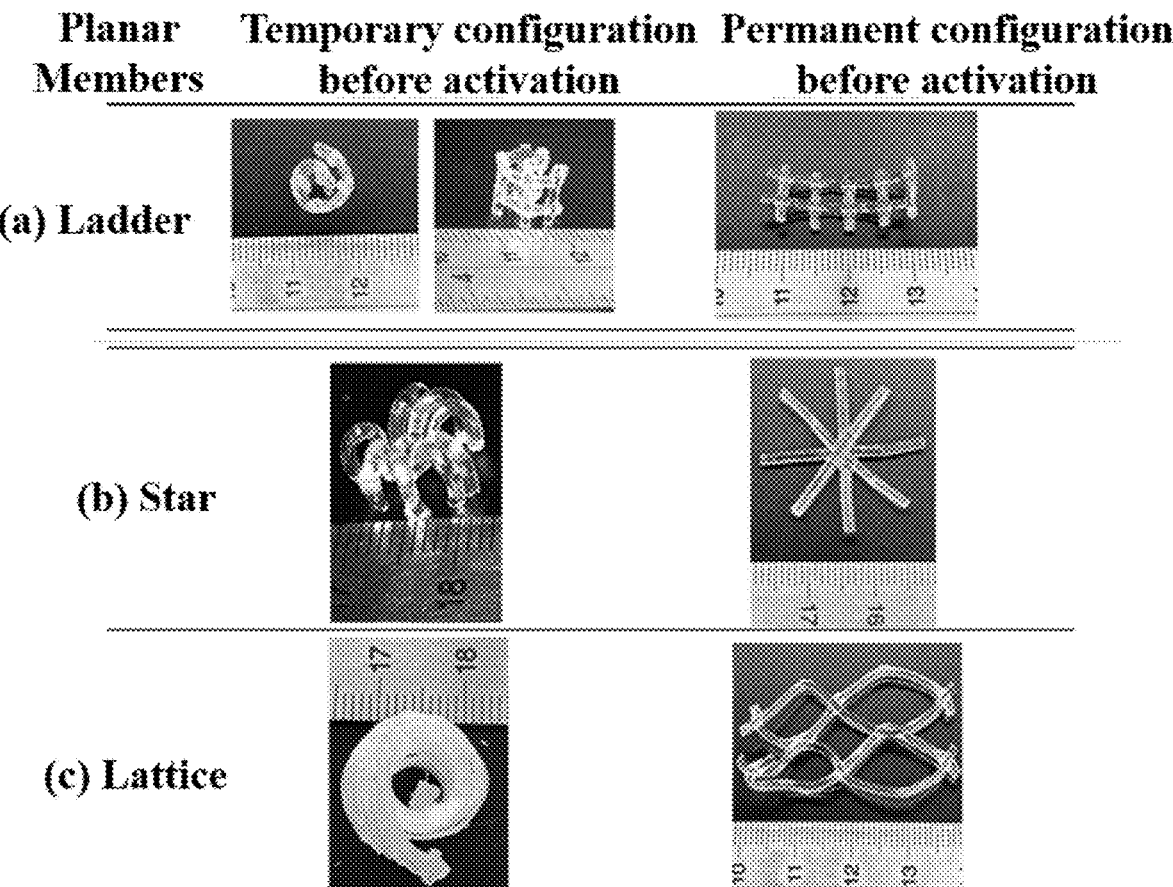
FIG. 6 shows planar members in their respective temporary and permanent shapes.

To plug the opening of large width fractures, it is first required to make bridging over the fracture opening to allow the settlement of granular and fibrous members to provide a sealing. For this purpose, three different planar members were fabricated and programmed. (I) Ladder structures were programmed by rolling to transform and present their original planar ladder shapes after recovery, (II) spider shapes were programmed to transform into planar star shapes after recovery, and (III) spindle shapes were programmed to present 2D lattices after recovery. In the following, details of programming steps are described. For more illustration, temporary and permanent structures of planar members are also given in FIG. 6.

Ladder structures were rolled along their widths, as demonstrated in FIG. 2, at the temperature above T$_g$, 70° C. Temporary configuration of ladder-shaped structure after programming, top- and side-views, as well as its permanent structure have been shown in FIG. 6. Star shapes with eight arms, the length of which was 12.5 mm, were fabricated as schematically shown in FIG. 2. For the purpose of programming, after heating the temperature of sample up to 70° C., each arm was bent twice in opposite directions to form a spider shape as illustrated in FIG. 2. As a result of this programming steps, spider shape is the temporary form of LCM which transforms to its permanent shape, star shape, after exposing to the high temperature of bottom-hole. Spider-shaped LCMs programmed in the lab and their recovered star-shaped forms have been presented in FIG. 6. The other temporary form of programmed LCMs presenting planar members after activation, is spindle-shaped. FIG. 1 schematically shows the permanent lattice shape and steps of programming to form spindle-shaped LCMs. The first step of programming was pulling both sides of lattice away under tension to close open spaces of lattice. Then, by keeping the tensile load, lattice was rolled. It is recalled that all steps of programming were performed at the high temperature of 70° C. The programmed form of the lattice, spindle-shaped, and its recovered shape, the 2D lattice, after heating above 70° C. have been shown in FIG. 6.

Figure 4:
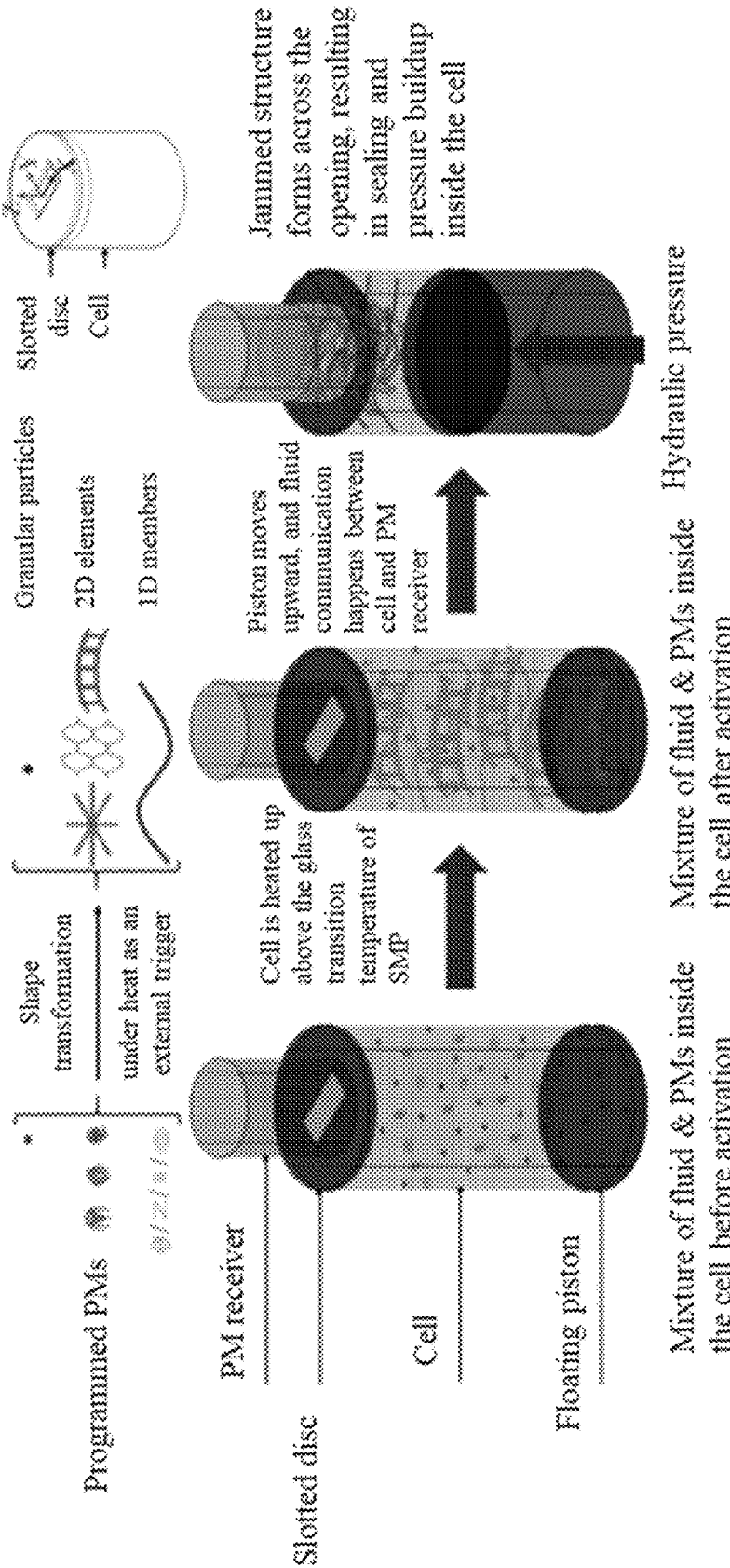
FIG. 4 shows a schematic representation of a plugging process using programmed shape memory polymer-based lost circulation materials.

Shape memory effect and self-assembly strategy can be combined to seal large width fractures remotely, Current study shows that a combination of granular, fibrous, and planar elements can be utilized to form a jamming structure and seal large width fractures. For example, sealing a large opening in underground formation rocks is a challenge in front of drilling industries. Drilling equipment especially bottom hole assembly has limitations on the size of plugging materials (granular, fibrous, and planar members) injected downhole. On the other hand, small plugging materials (PMs) cannot seal large fractures. Development of a technology allowing the injection of small enough elements, which are able to enlarge after reaching to the target zones and form a jamming structure, is the main focus of this study. Large width fracture can be mimicked with a slotted disc, as shown in FIG. 4, with the width of 12 mm and the length of 17.5 mm. There are recent studies in the literature [28-30], investigating the potential application of PMs made of SMPs in sealing fractures with the width of 2.54 mm and the length of 7.08 mm.

As evidence for the formation of a jamming structure from discrete activated PMs, fracture plugging tests (FPTs) are conducted. This experimental setup, as illustrated in FIG. 4, is composed of a high-temperature high-pressure cell with the maximum temperature and pressure capacity of 260° C. and 5000 psi, respectively. Given the formation of seal across the fracture opening, a pressure buildup inside the cell is measured. The measurement of pressure buildup proofs that elements inside the cell have sealed the slotted disc.

FPT cell provides an aqueous/oily environment for SMP-based plugging materials to move freely. A water-based liquid composed of water and bentonite with 2.45 vol. % (5.94 wt. %) of bentonite to water was used to allow programmed members to be mobile. In this experiment as schematically exhibited in FIG. 4, there is a fluid communication between the cell, where fluid including plugging materials is placed, and a receiver through a slotted disc which simulates a fracture. As mentioned earlier, a slotted disc with the slot width of 12 mm was selected to examine the efficiency of programmed granular, fibrous, and planar members in plugging large fractures. In this equipment, there is a floating piston located at the bottom of the cell which separates the fluidic environment from the hydraulic pump oil. After heating the cell up to the testing temperature, the hydraulic oil is pumped to push the floating piston and, consequently, pressurize the mixture of liquid and plugging materials. As a result of upward movement of the mixture, it penetrates through the disc slot placed above the mixture (shown in FIG. 4). When the slotted disc is sufficiently sealed, no more liquid communication can happen between the cell and the receiver. Therefore, further upward movement of piston by pumping more hydraulic oil into the space behind the piston will build up pressure inside the cell. When the pressure goes beyond the maximum strength of the jamming structure formed by activated PMs to support the pressure inside the cell, the pressure drops suddenly. The entanglement and friction between discrete elements (granular, fibrous, and planar members) can be important factors determining the strength of the jamming structure against washing away.

To run tests, a mixture of liquid and a combination of programmed granular, fibrous, and planar members are poured inside the fracture plugging cell. To prepare mixture, 170 mL liquid composed of water and bentonite was mixed with all programmed plugging materials (presenting granular, fibrous, and planar members after activation) inside a mixer to obtain a uniform dispersion of components.

Figure 7:
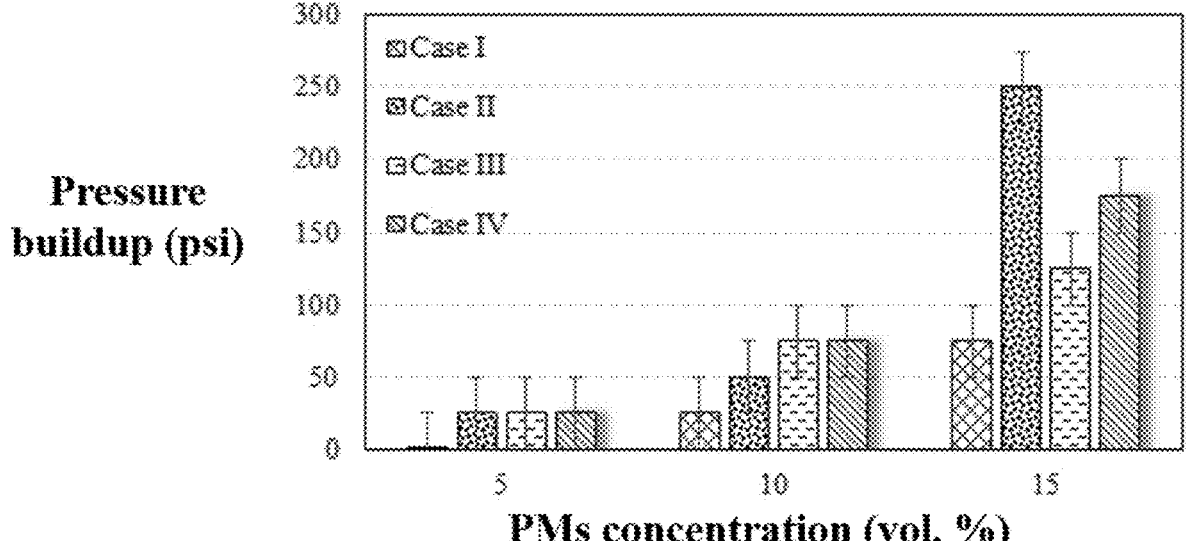
FIG. 7 shows a graphical representation of pressure buildup as a function of concentration of plugging materials.
Figure 8:
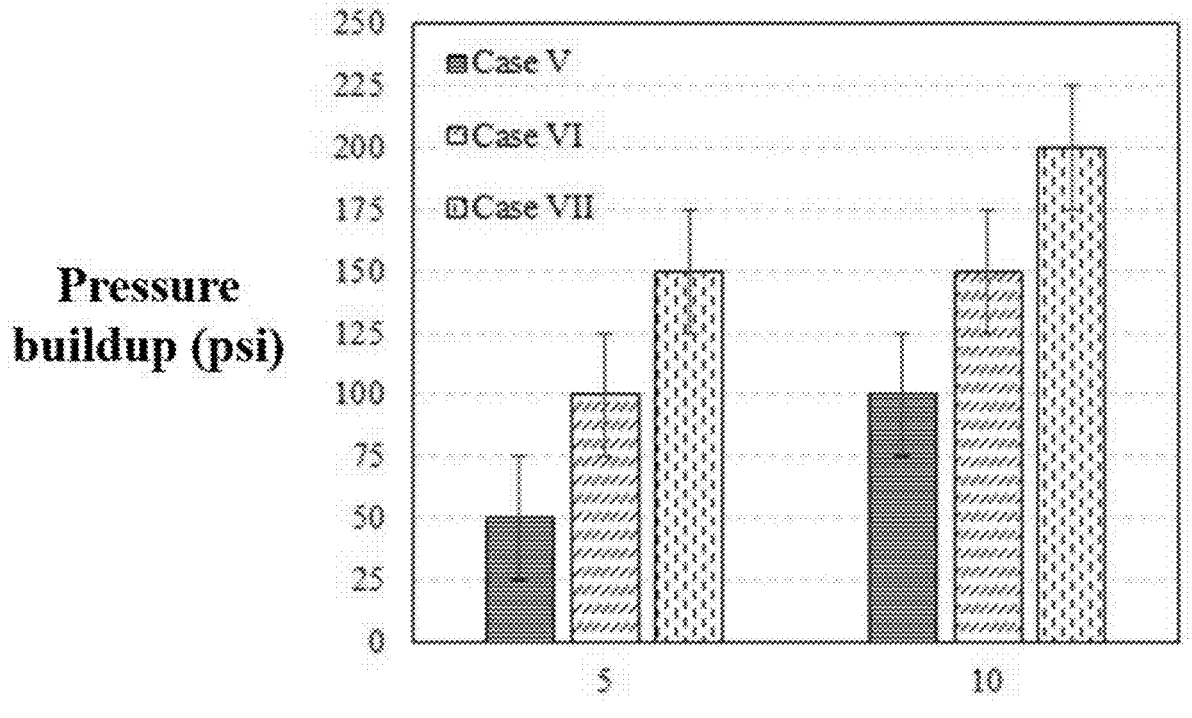
FIG. 8 shows a graphical representation of pressure buildup as a function of concentration of lost circulation materials.

The amounts of pressure buildup measured after running FPTs are provided in FIGS. 7 and 8 corresponding to different concentrations and compositions of plugging materials. Corresponding to each set of concentration and composition of PMs, tests were repeated for three times. Values of pressure buildup measured from all three repetitive tests fell within the region indicated by error bars in FIGS. 7 and 8. The pressure starts building up when plugging has already happened.

Figure 9A:
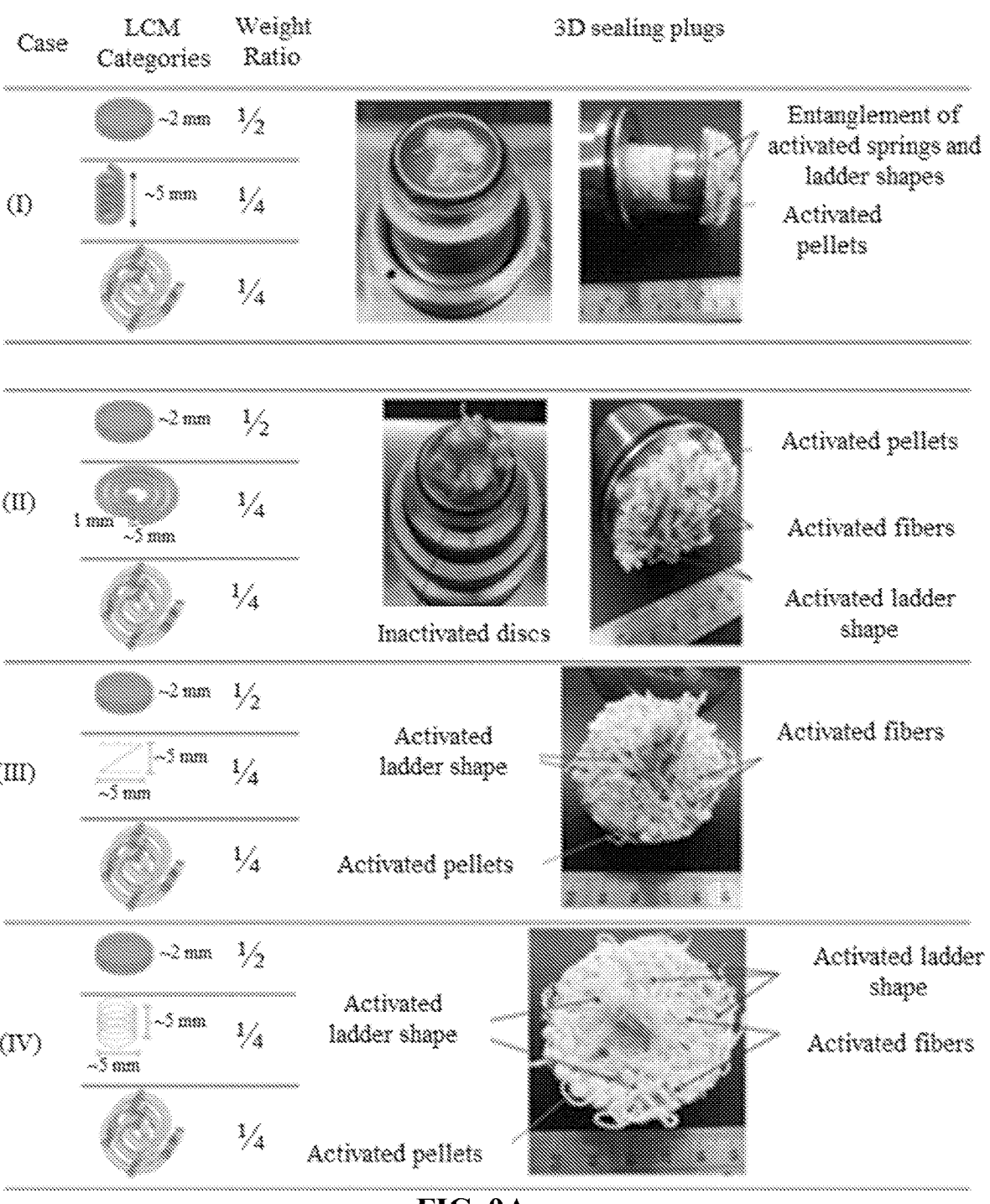
FIG. 9 shows plugs formed after running fracture plugging tests.
Figure 9B:
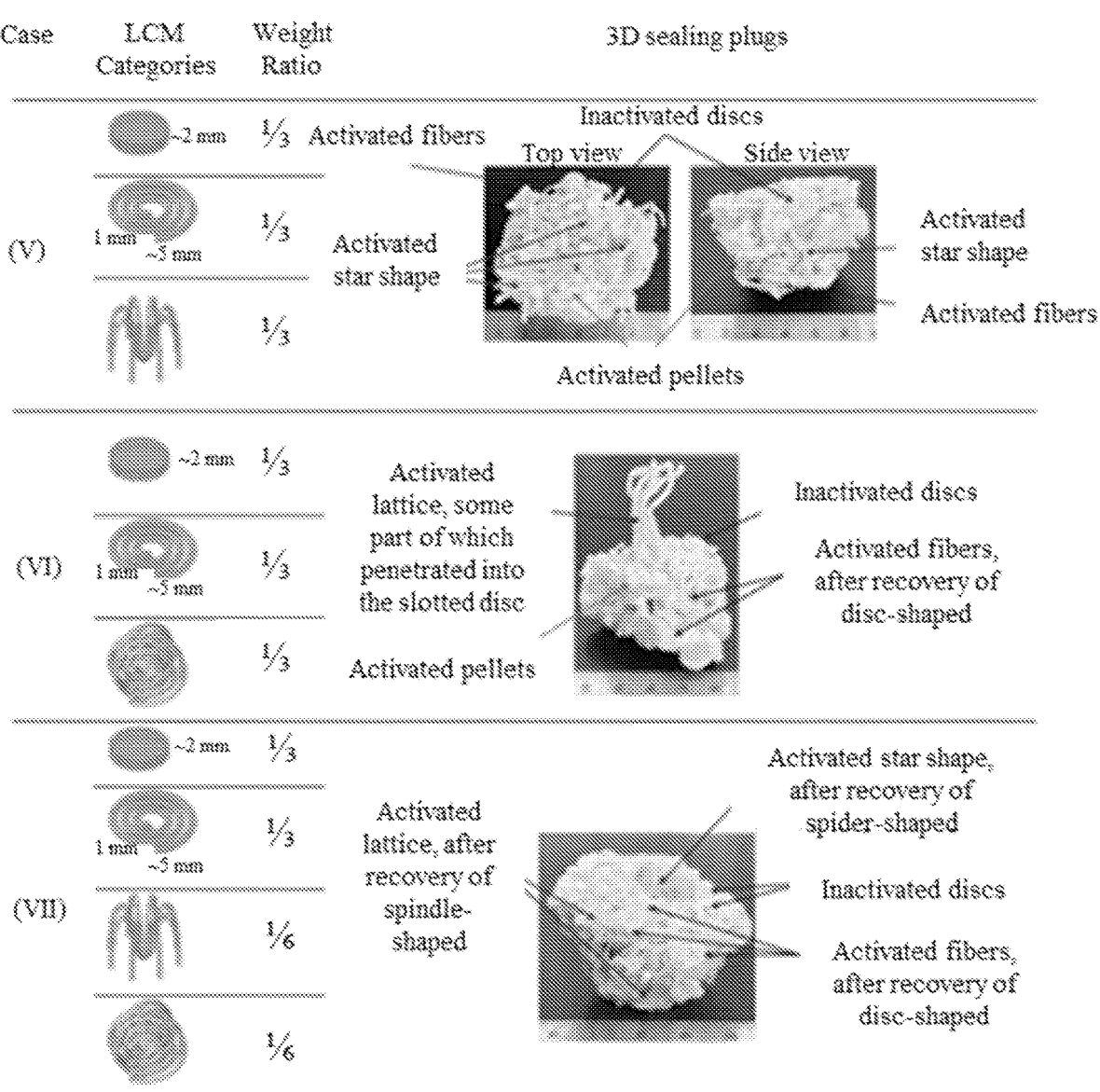

For the cases when the ladder structures were presenting planar members after activation, different concentrations of plugging materials, 5, 10, and 15 vol. %, were examined. For each concentration of PMs, the weight ratio of filling granular members to planar members (entangled ladders) or fibrous members (interwoven fibers) was maintained as two. As discussed, different configurations of programmed filaments as shown in FIG. 5 play the role of fibrous members after activation. The effect of different processes of programming of filaments on the formation of plugging was studied by making PMs including any of spring- and disc-shaped as well as spiral- and zigzag-shaped springs for each concentration of PMs. For illustration, some of 3D plugs formed after running FPTs are shown in FIG. 9. As it is found from FIG. 7, zigzag- and spiral-shaped springs can provide the minimum pressure buildup of 50 psi for the case when the concentration of PMs is 10 vol. %, while they end up in that of 100 psi and 150 psi for the case of 15 vol. %, respectively. For the case when fibrous members are presented by spring-shaped configurations, the concentration of 15 vol. % can build up the minimum pressure of 50 psi with certainty. When the concentration of PMs is 10 vol. %, and spring-shaped structures are replaced with disc-shaped, the pressure buildup improves about 100%. It can be concluded that a significant improvement is achieved in the pressure buildup by replacing spring-shaped with each of other configured filaments which result in longer fibers. As presented in FIG. 5, the configured filaments of spring- and disc-shaped as well as zigzag- and spiral-shaped springs can activate fibers with the length of 30 mm, 60 mm, 90 mm, and 100 mm, respectively. However, it is noticeable that for the case when the concentration of PMs is 15 vol. %, disc-shaped structures result in the highest amount of pressure buildup as compared to other spring-, zigzag-, and spiral-shaped configurations. Therefore, in addition to the length of fibers, there should be other parameters affecting the efficiency of PMs.

FIG. 8 shows how different compositions of LCMs, cases V, VI, and VII in FIG. 9, with different concentrations affect the amounts of pressure buildup in PPA tests. From FIG. 8, it is found that the spindle-shaped LCMs, presenting 2D lattices after activation, are more effective than spider-shaped LCMs, presenting 2D star shapes after activation, in plugging large width fractures. It can be attributed to the high efficiency of lattices in bridging large apertures. Regarding the mechanism of plugging, planar members (lattices and star shapes) and fibrous members form an entangled network across the fracture, generating a bridge and providing a substrate to trap granular members. Therefore, granular members can fill the porous areas of the formed network/bridge and, consequently, result in sealing. It is also interesting to note that when a combination of lattices and star shapes is used to present planar members (case VII), the highest-pressure buildup is achieved as compared to other cases when only one of the lattices or star shapes are used. It may be concluded that star shapes with eight arms and lattices can provide better entanglement and stronger 3D structure (plug) in the presence of each other. From FIG. 8, it is also seen that for the case (V), the increase of LCM concentration from 5 vol. % to 10 vol. % increases the amount of pressure buildup by 100%. While for the case (VI), 10 vol. % concentration of LCMs enhances the pressure buildup by 50% as compared to the concentration of 5 vol. %. For the case (VII), the improvement in pressure buildup is about 33% by increasing LCMs concentration from 5 vol. % to 10 vol. %.

Figure 10:
FIG. 10 shows an exemplary plug.
Figure 10:
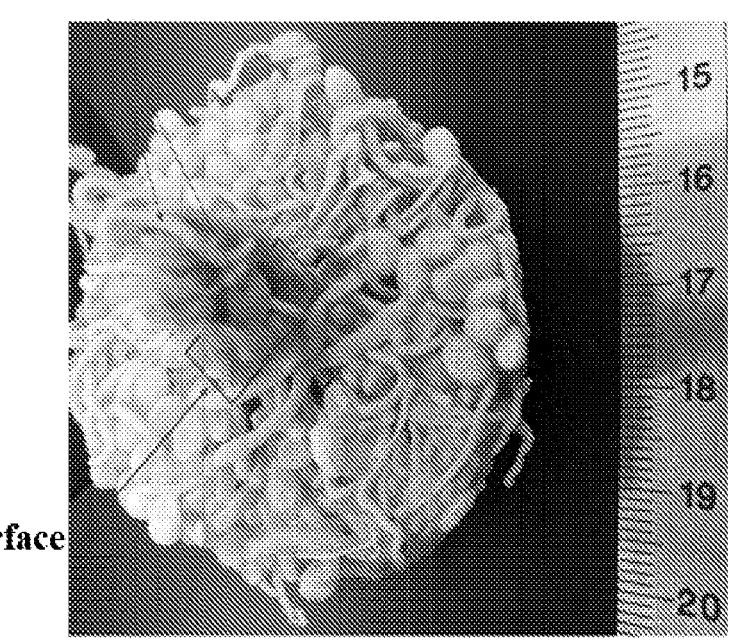
Figure 11:
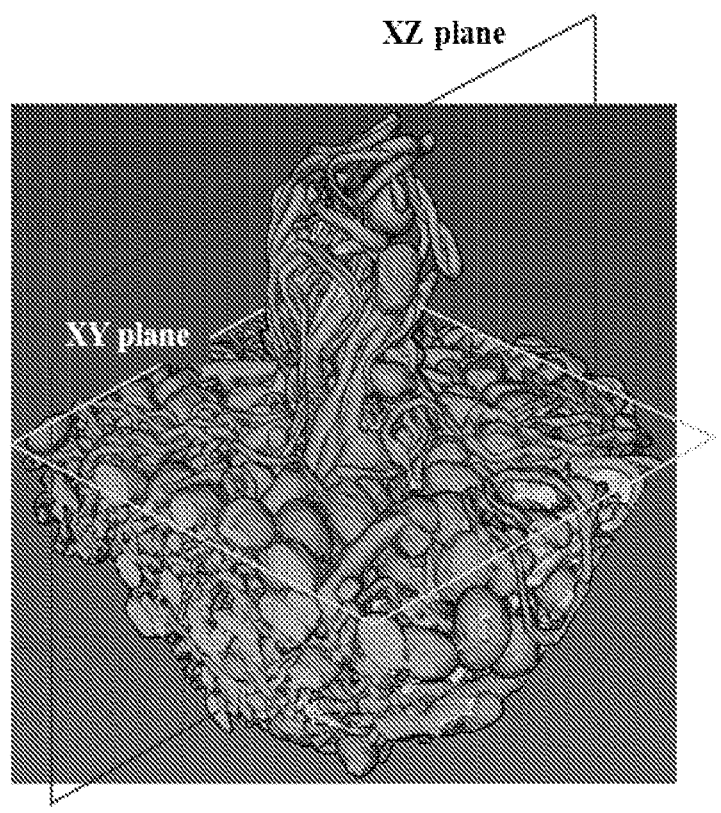
FIG. 11 shows a 3D view of a CT image of a plug.
Figure 14:
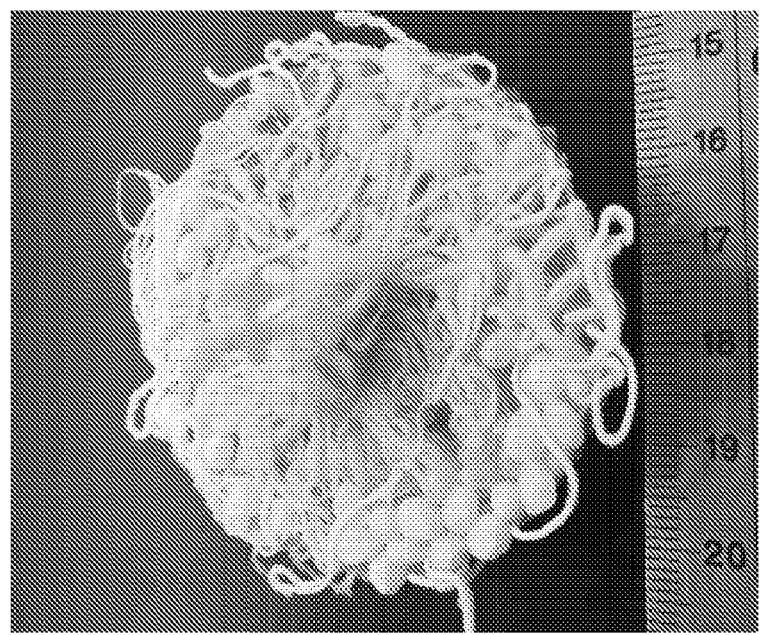
FIG. 14 shows an exemplary plug.
Figure 15:
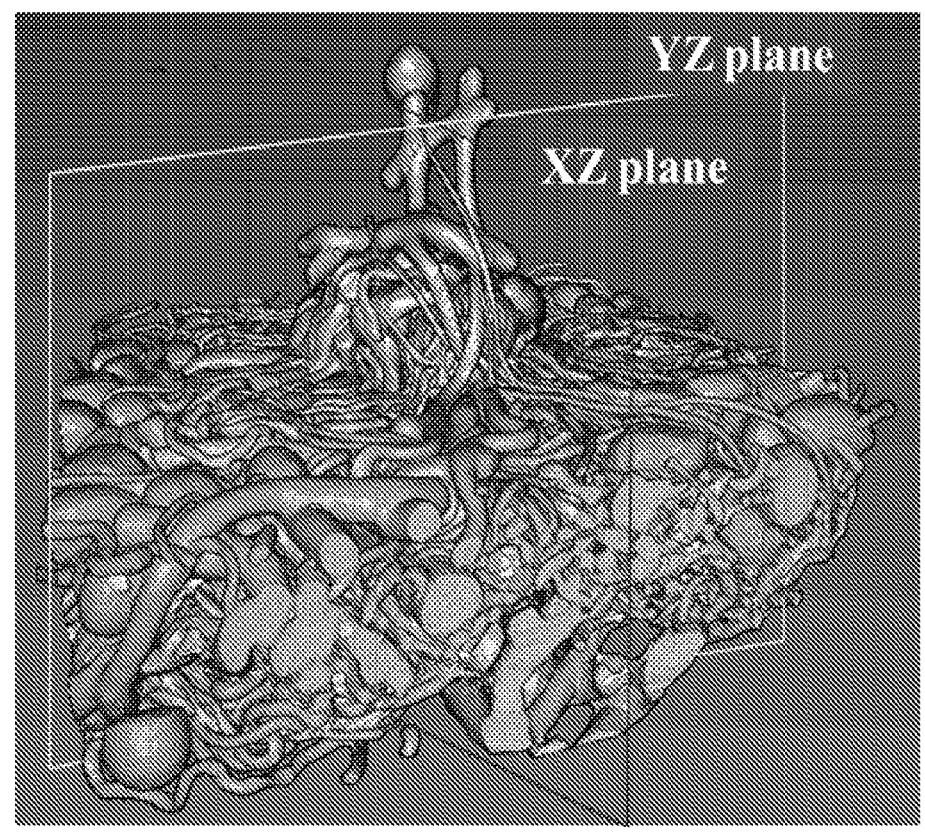
FIG. 15 shows a 3D view of a CT image of a plug.

The technique of 3D X-ray computed tomography (CT) was employed to figure out how the activated granular, fibrous, and planar members are self-assembled and form a plug. To this end, two plugs as shown in FIGS. 10 and 14 were selected for the CT scan. These plugs were formed to seal a 12 mm slotted disc after running FPTs. FIG. 10 corresponds to the case when the concentration of PMs is 10 vol. %, and zigzag-shaped springs present fibrous members after activation. FIG. 14 presents the same concentration of PMs as FIG. 10, with the difference that spiral-shaped springs produce fibers. The technique of CT imaging associated with Avizo software was used to visualize the internal structure of plugs.

Figure 12:
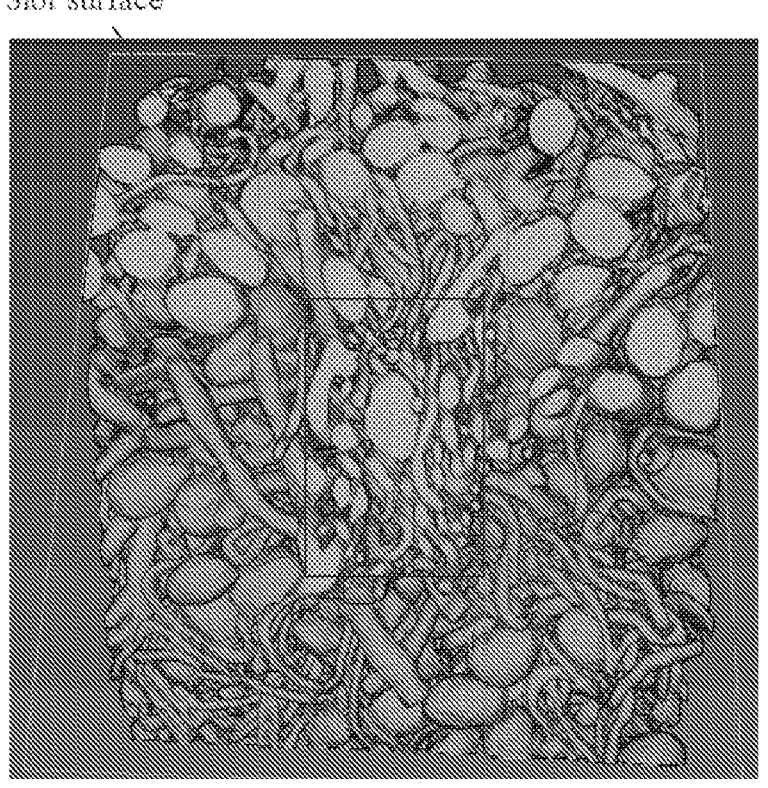
FIG. 12 shows a top view (XY plane) of a CT image of a plug.
Figure 13:
FIG. 13 shows a side view (cut by XZ plane) of a CT image of a plug.
Figure 16:
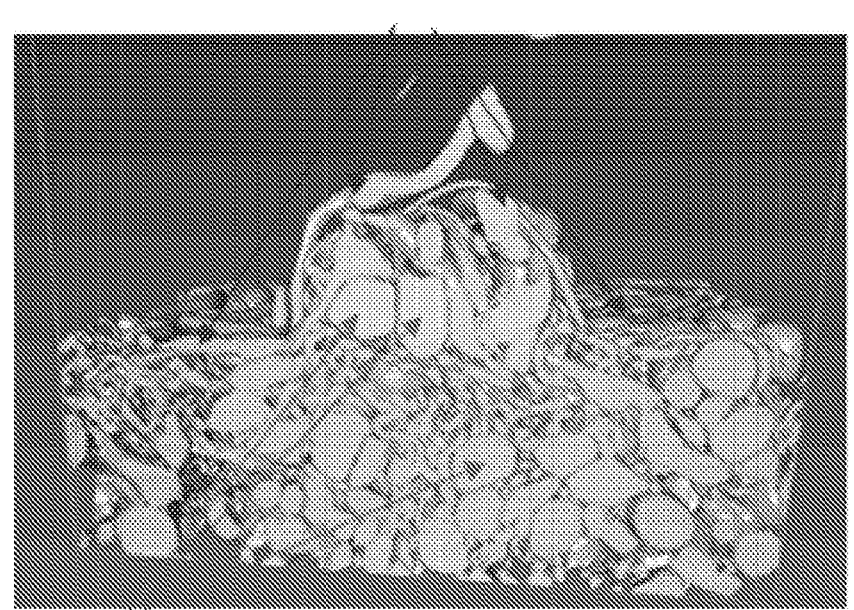
FIG. 16 shows a side view (cut by XZ plane) of a CT image of a plug.
Figure 17:
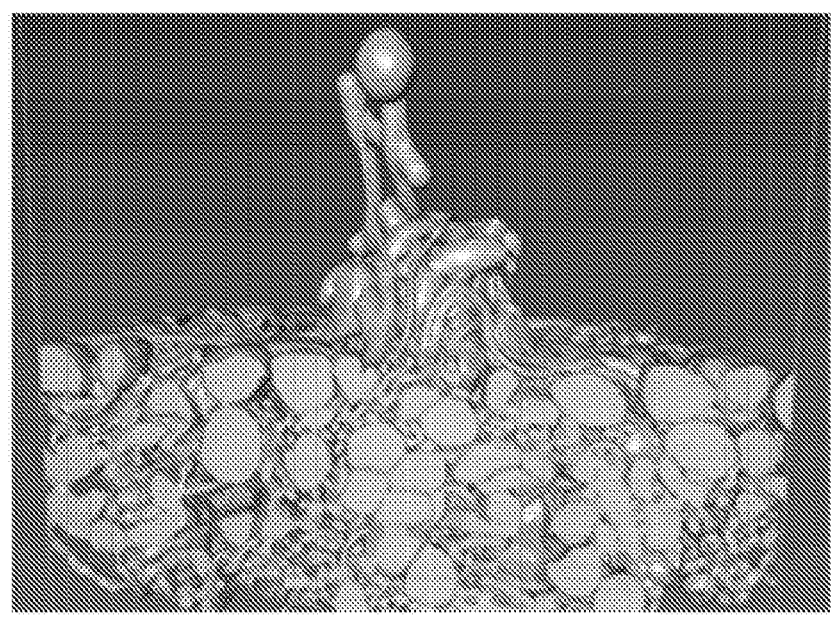
FIG. 17 shows a side view (cut by YZ plane) of a CT image of a plug.
Figure 18:
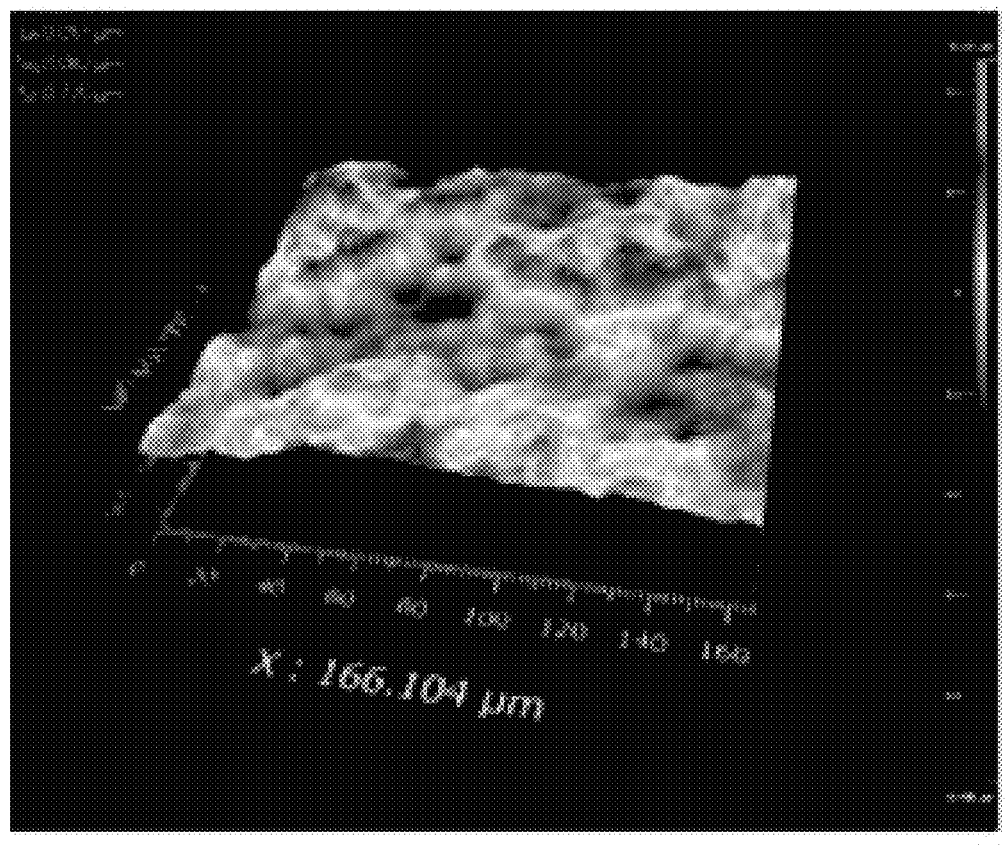
FIGS. 18-21 shows 3D topographies of fibrous members made from different thermochemical processes.
Figure 19:
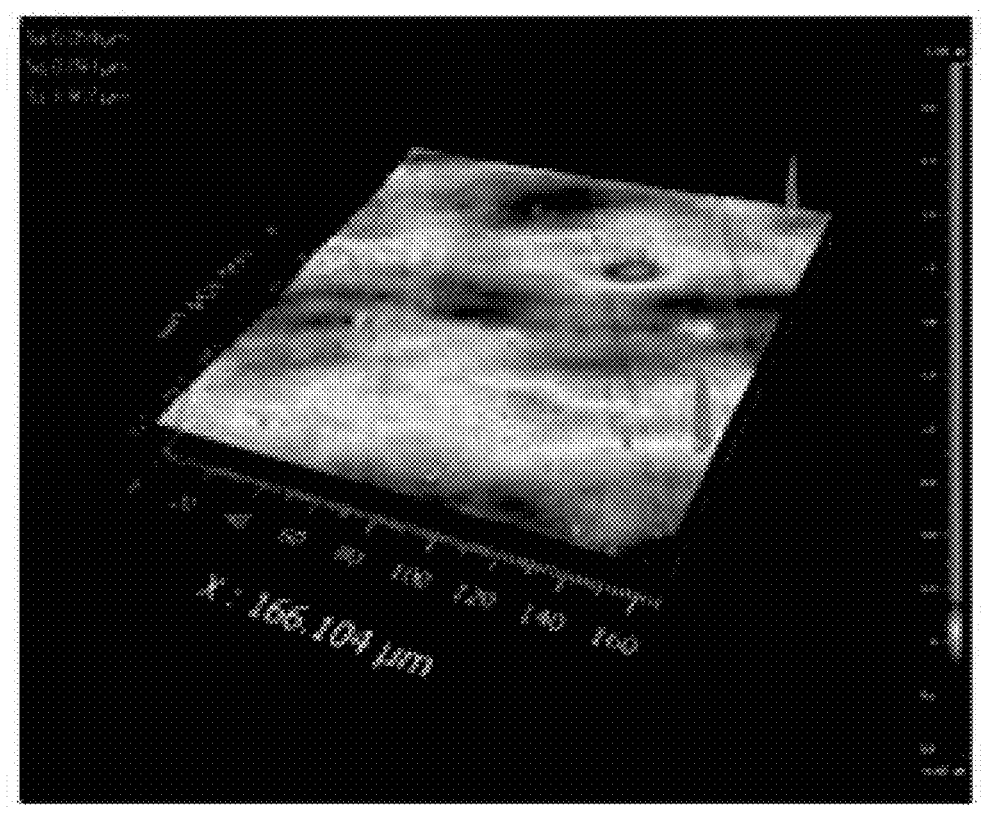
Figure 20:
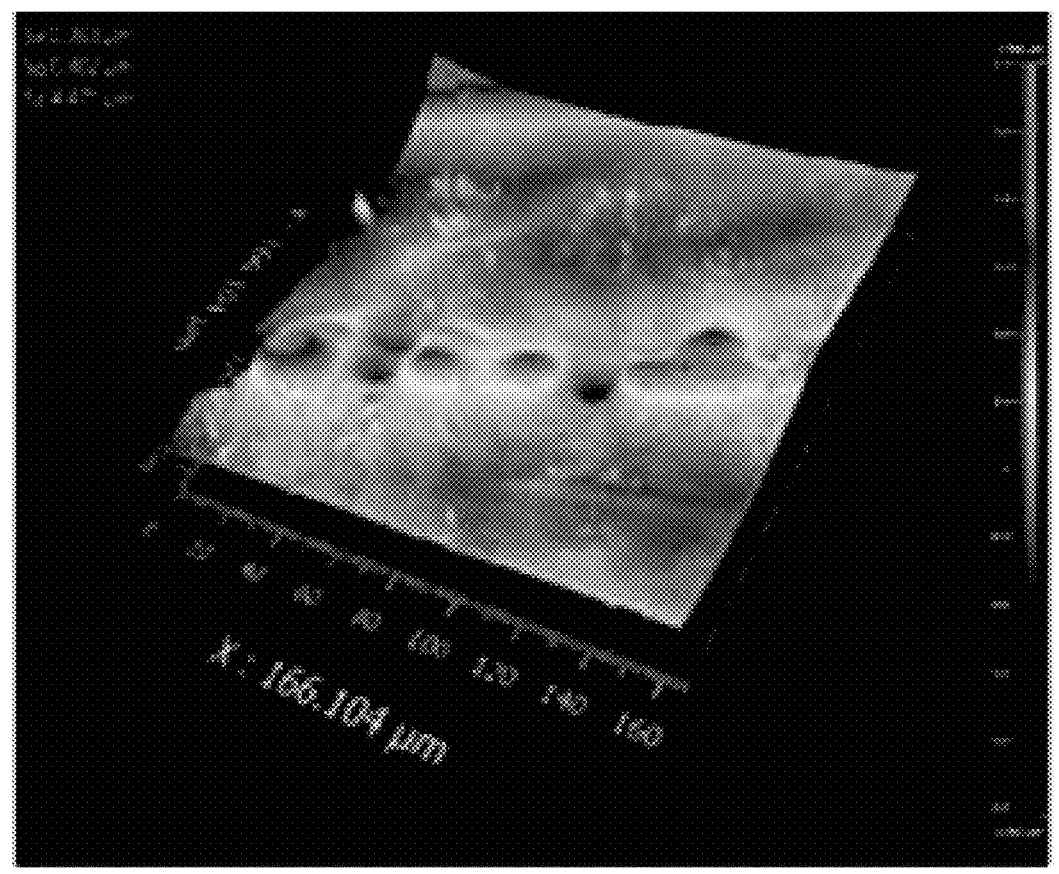
Figure 21:
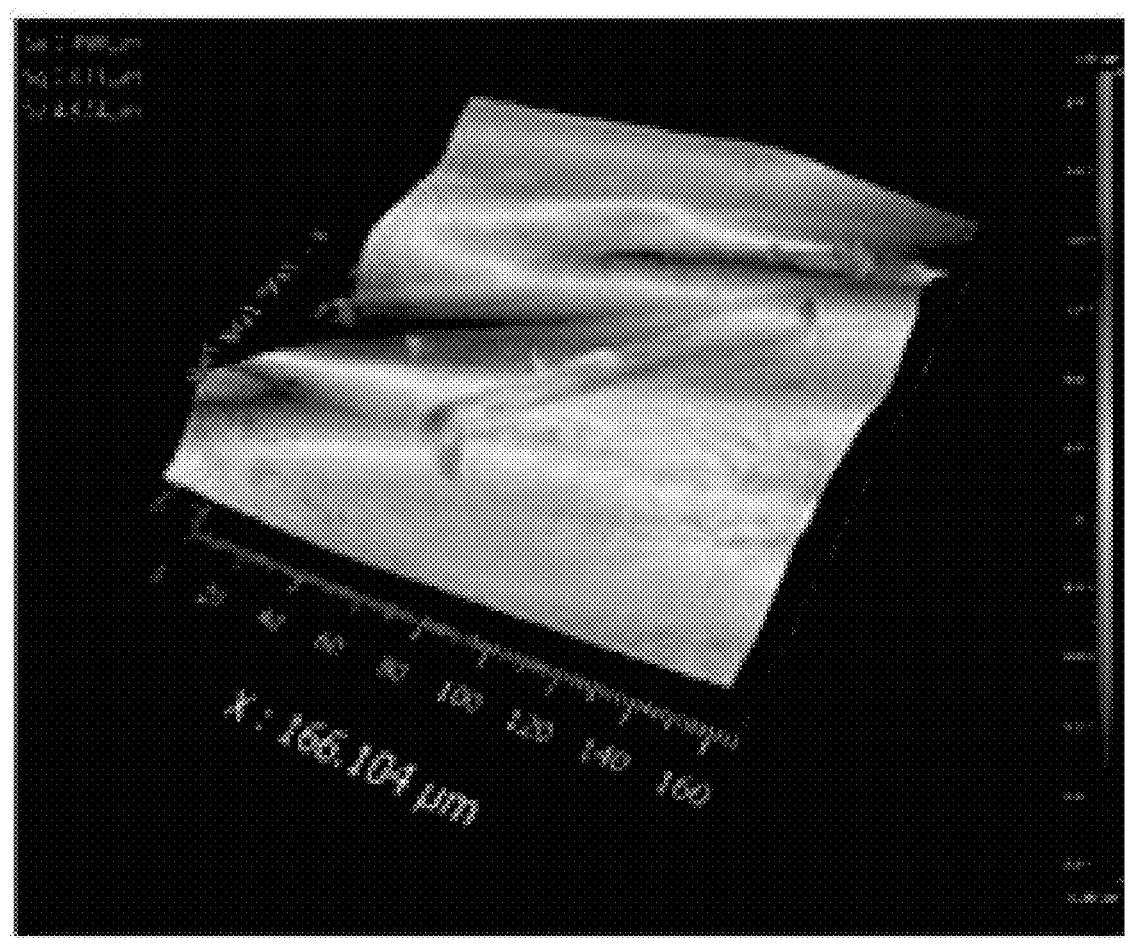

FIGS. 11-13 and 15-17 present the CT images corresponding to FIGS. 10 and 14, respectively. The appearance of fibrous members, granular members, and ladder shapes inside the plug reveals the activation of programmed PMs. Moreover, it is seen that activated fibers provide an interwoven/jamming structure. This observation can be attributed to the formation of sawtooth irregularities on the surface of fibrous members transformed from spiral- and zigzag-shaped springs, previously shown in figures presented in FIG. 5. In fact, the presence of sawtooth irregularities enhances the mechanical interlocking and results in the generation of a netted blanket in collaboration with ladder-shaped elements. The formation of netted blanket makes it possible to bridge the opening of large width fractures. On the other hand, it provides a mechanism to trap the granular members. As a result of that granular members fill the porous spaces and, consecutively, provide sealing. FIGS. 12 and 13 as well as 16 and 17 illustrate how granular members are trapped between interwoven fibers and entangled ladder-shaped elements. FIGS. 12 and 16 show the formation of netted blanket across the slot and the trapped granular members, marked by arrows. It is reiterated that a combination of all geometries of activated plugging materials, granular members as well as fibrous and planar members can be utilized to generate a jamming structure resulting in sealing or jamming) the wellbore, pipe, structure, etc. Entangled ladder-shaped elements (planar members) bridge over the fracture opening, fibrous members reinforce the formed bridge and reduce the porosity of bridge (formation of a netted blanket as marked in FIG. 16). As a result of that, granular members can get trapped inside the remained porous spaces and result in sealing.

It is well-known that the surface topology of materials can play an important role on their mechanical interlocking. Preliminary simulations of bridging and plugging of fractures with granular members have shown the significant role of the inter-particle friction [30]. This friction can be due to the inherent or induced roughness of the surface of the granular member. In this example, the technique of optical profilometry was used to examine the effect of different thermomechanical programming on the surface profile of activated fibers. This technique enables us to determine variations in the height of the surface texture with respect to the mean plane and, subsequently, measure areal roughness parameters (ISO 25178-2, 2012) through the surface profile, z(x,y), $$S_a = \frac{1}{A} \int \int_A |z(x, y)| \, dx \, dy, \tag{3}$$

which defines the arithmetic mean of absolute values of vertical deviation from the mean plane. $S_q$ is the root mean square height of the surface, $$S_q = \sqrt{\frac{1}{A} \int \int_A z(x, y)^2 dx \, dy}, \tag{4}$$

and, $S_z$ which is the averaged distance between the highest asperities and the lowest valleys through the profile, $$S_z = \frac{1}{n} \sum_{i=1}^{n} S_{z_i}. \tag{5}$$

The mean plane is defined so that the volume between the surface profile and the mean plane located above the mean plane becomes equal to that placed below the mean plane. Since the measurements of areal roughness parameters are with respect to the mean plane, the standard deviation, a, which is the square root of the arithmetic mean of the square of the vertical deviation from the mean plane, becomes equal to $S_q$.

Figure 22:
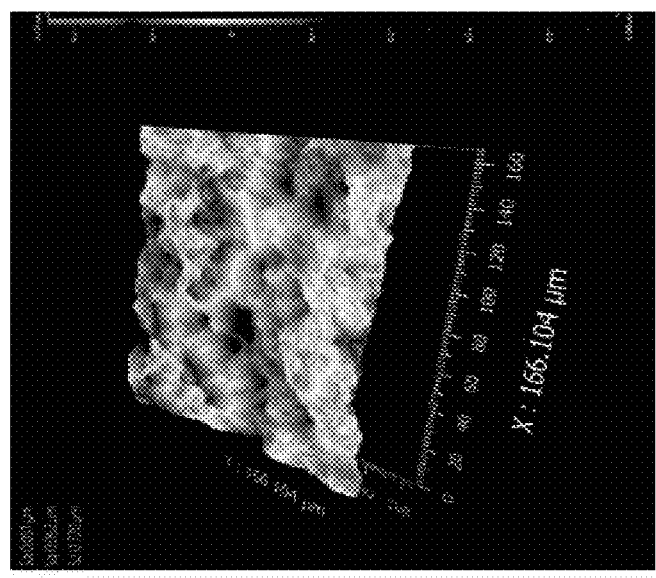
FIG. 22 shows 3D topographies of different spots along the surface of original shape memory polymer filament before programming.
Figure 22:
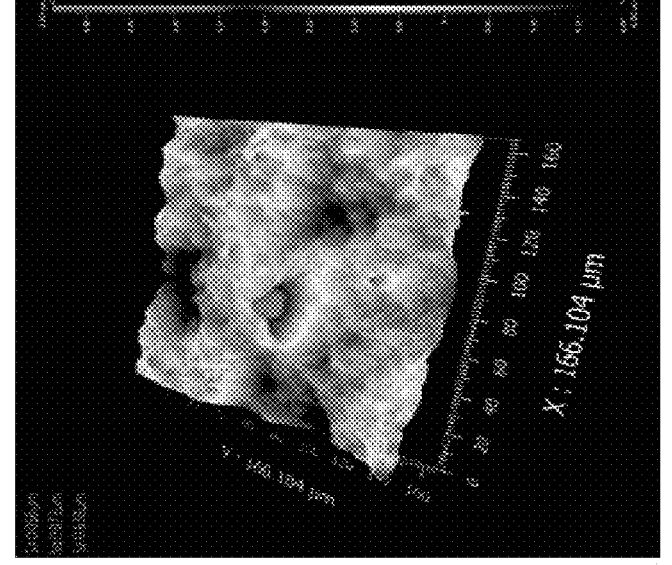
Figure 22:
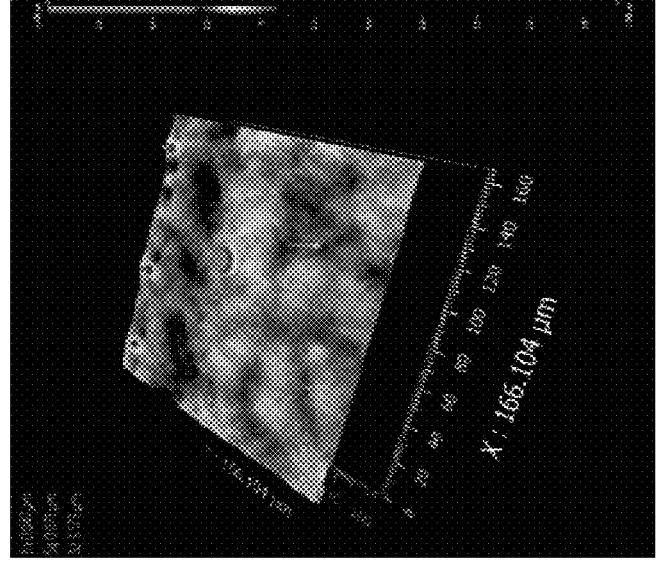
Figure 23:
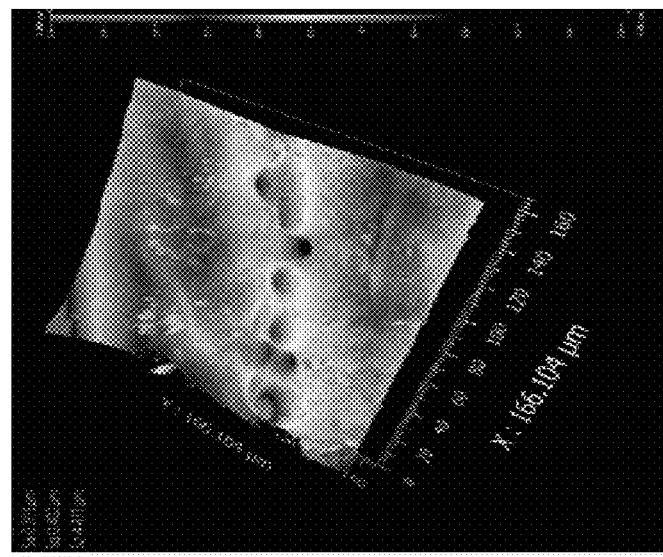
FIG. 23 shows 3D topographies of different spots along the surface of shape memory polymer transformed from disc-shaped members.
Figure 23:
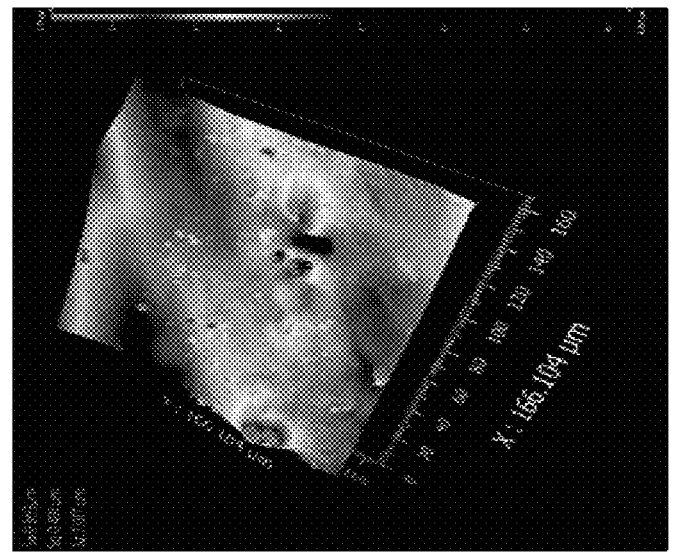
Figure 23:
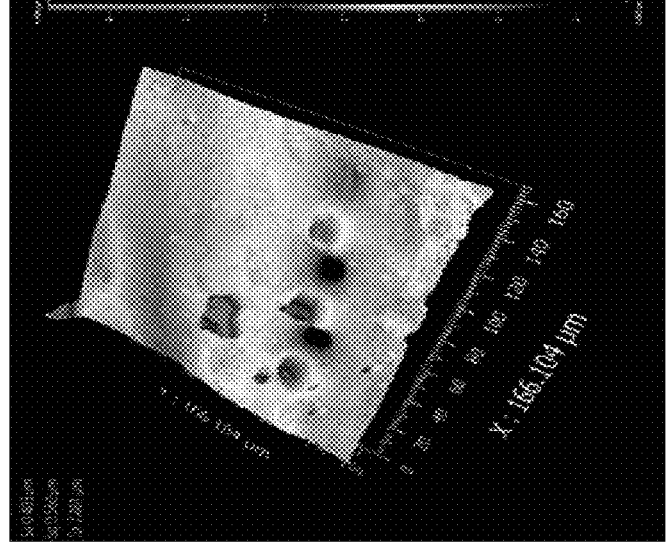

Results obtained from optical profilometry including 3-D topography and roughness parameters are summarized in FIGS. 18-21. To evaluate the effect of programming processes on the surface properties of fibrous members after activation, the surface profile of the original filament is also examined and presented in FIGS. 18-21. Original filament is the initial material before going under any process of thermomechanical programming. However, for other fibrous members given in FIGS. 18-21, they have been recovered from different temporary shapes. Therefore, values corresponding to the original filament can be used as a baseline to weight the value of programming on the surface parameters. Each roughness parameter is the average of values measured at three different spots along the fiber. For further illustration, measurements obtained from optical profilometry at three different spots for the cases of original filament and the fiber transformed from disc-shaped LCMs are given in FIGS. 22 and 23, respectively. Comparison between the areal roughness parameters of original fiber (filament) and those corresponding to all other activated fibers shows that the original fiber has the smoothest surface profile. For example, the parameter of $S_q$ for the fibers recovered from spiral-shaped springs, disc shapes, and zigzag-shaped springs increases, respectively, about 924%, 612%, and 72% as compared to the original fiber. Comparison between recovered fibrous members shows that the method of programming of spiral-shaped springs not only results in the longest activated fibers, but also, ends up in the highest values of roughness parameters. It is noticeable that the programming process of disc-shaped configurations induces more roughness, about 314% in the case of Sg, as compared to those of zigzag-shaped programming method. However, the length of activated fibers corresponding to the disc-shaped is about 33% shorter than that of the zigzag-shaped springs.

Optical profilometry shows that different thermomechanical steps of programming lead to the recovery of fibrous members with different surface properties. This behavior can be attributed to the different mechanisms of mechanical loading employed for each programming process. For example, spinning around a copper wire with a very small diameter or twisting will result in the anisotropic dimensional changes in the radial direction of fibers, generating intrinsic surface properties upon heating. In the case of spiral- and zigzag-shaped springs where filaments go first under tensile loading before twisting, tensile recovery results in the radial expansion of fibrous members [31], in addition to the bending and twisting recovery. All these phenomena will end up in different surface properties.

Associated with roughness parameters discussed earlier, spatial functions are determined that can provide a complete characterization of a profile or a surface. Of these functions are structure function, $S(\tau)$ and the power spectral density function, $P(\omega)$. The mathematical form of these functions along x-axis is given in the following [32], which can be easily expanded to 2-D, $$S(\tau) = 2\left[\sigma^2 + m^2 - R(\tau)\right] = 2\sigma^2[1 - C(\tau)], \tag{6}$$

in which, $C(\tau)$, called as the autocorrelation function, is the normalized form of the autocovariance function, $R(\tau)$, $$C(\tau) = \left[R(\tau) - m^2\right]/\sigma^2, \tag{7}$$

and $$R(\tau) = \lim_{L\to\infty} \frac{1}{L}\int_0^L Z(x)Z(x+\tau)\,dx. \tag{8}$$

$\tau$ is any spatial distance, and m, which is determined with respect to a reference line as below, $$m = \frac{1}{L}\int_0^L Z(x)\,dx, \tag{9}$$

becomes zero for the special cases when the reference line/plane coincides with the mean line/plane. For many engineering surfaces, $C(\tau)$ forms an exponential function in terms of a correlation length of $\beta^*=2.3\beta$ which is the length over which $C(\tau=\beta^*)=0.1$, [32]

$$C(\tau) = \exp(-\tau/\beta). \tag{10}$$

The power spectral density function, $P(\omega)$ is another form of spatial representation and is the Fourier transform of the autocovariance function, $R(\tau)$, [32]

$$P(\omega) = 2\int_0^\infty R(\tau)\cos(\omega\tau)\,d\tau, \tag{11}$$

where, $\omega$ is the angular frequency in length$^{-1}$.

Ganti and Bhushan [33] developed the G-B model with a lateral resolution, $\eta$ as the intrinsic length unit, allowing the characterization of surface roughness by two fractal parameters D and C. In their developed model, D is the fractal dimension and C is the amplitude coefficient, which are machine-independent parameters. They derived the structure function, $S(\tau)$ and the power spectral density function, $P(\omega)$ in terms of the fractal parameters, D and C, and the lateral resolution, p as below $$S(\tau) = C\eta^{(2D-3)}\tau^{(4-2D)}, \tag{12}$$

$$P(\omega) = \frac{c_1\eta^{(2D-3)}}{\omega^{(5-2D)}}, \tag{13}$$

in which, $$c_1 = \frac{\Gamma(5 - 2D)\sin[\pi(2 - D)]}{2\pi}C. \tag{14}$$

Using Eq. (10) and $\sigma=S_q$ into the Eq. (6) or Eq. (11), the structure function, $S(\tau)$ or the power function, $P(\omega)$ are obtained based on the measured values of the areal roughness parameters. The lateral resolution of the instrument, q used here for optical profilometry is in the range of 0.3-8 microns. Then, by fitting them, respectively, to Eqs. (12) or (13), the fractal parameters, D and C, can be calculated. The log-log plot of $S(\tau)$ as a function of $\tau$ or that of $P(\omega)$ as a function of $\omega$ will give us straight lines in such a way that the slope of line is related to the fractal dimension, D and the intersection of line with the vertical axis is related to the parameter C. In the following, log-log plots of $S(\tau)$ corresponding to spiral-, disc-, and zigzag-shaped structures are presented in FIG. 24. The formulation of all straight lines has been also included in FIG. 24.

Figure 24:
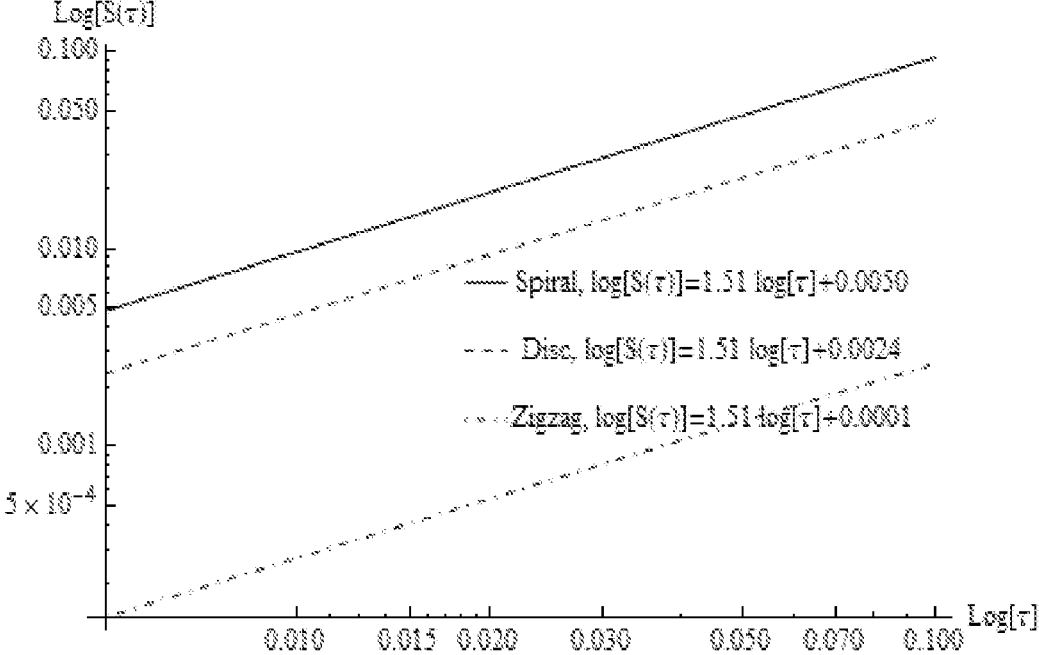
FIG. 24 shows a log-log plot of structure function corresponding to the surface texture of fibers transformed from different structures.

From FIG. 24, it can be concluded that the fractal dimension of all fibrous members provided via the current thermomechanical processes of programming corresponds to 1.51 which is greater than 1. According to the G-B model [33], the friction coefficient of the surface has a reasonable correspondence with the parameter C. Therefore, from the intersection of plots presented in FIG. 24 with the vertical axis, one may find that the fibrous members transformed from the spiral-shaped springs possesses the highest coefficient of friction. However, fibers recovered from the zigzag-shaped springs show much lower friction coefficient than those transformed from disc-shaped configurations. It can be of reasons that, although, the length of fibers recovered from zigzag-shaped are greater than that corresponding to the disc-shaped, the latter fibers generate higher amounts of pressure buildup. Recently, Lee and Dahi Taleghani [30] showed the significance of friction between granular members in providing enough mechanical interlocking to sustain the bridging effect inside the fracture through simulations.

The programmable properties of shape memory polymers can be combined with the self-assembly strategy to develop smart last circulation materials (LCMs) for sealing large width fractures, remotely. The equipment and other physical constraints can put limitations on the size of injected materials. Small size materials with sizes meeting the limitation are not capable of sealing wide fractures. The idea is the fabrication of discrete small-sized components which can be trigged by heat and enlarged about one order of magnitude as compared to their original shape. Then, discrete activated members are remotely self-assembled and form a jamming three-dimensional structure to seal the large-width fracture. The question becomes the structure of individual components enabling a seal to be formed so that it jams the fractured structure (e.g., wellbore, pipe, etc.), or an opening or fracture formed therein. It was found that a combination of all granular members, fibrous members, and planar members can be utilized to achieve the goal. As an evidence for the formation of a jamming structure sealing the large width fractures, a series of tests were conducted, allowing to measure the pressure buildup upon the formation of a jamming plug. In other words, non-zero pressure buildup was obtained only if the fracture has been sealed by the jamming structure. One can utilize different thermomechanical processes including rolling, twisting, folding, loading under tension and compression to produce small-sized temporary shapes which can be transformed to a variety of permanent shapes, including granular, fibrous, and planar members, after exposure to high temperatures.

The surface roughness properties of activated fibrous members and its role on the strength or mechanical interlock of the jamming structure against pressure was also examined. For this purpose, four different temporary shapes (spring, disc, zigzag-shaped springs, and spiral-shaped springs) were programmed to present fibrous members after activation. Optical profilometry was used to study how different thermomechanical steps of programming affect the surface roughness parameters of activated fibers. For the sake of comparison, parameters corresponding to the original fabricated filament before doing any thermomechanical programming were also measured, showing the smoothest surface as compared to all other activated fibers. The incorporation of results obtained from the optical profilometry into the G-B model (Ganti and Bhushan, 1995) showed that all activated fibers possess a fractal dimension higher than one, about 1.51. Contrary to the straight-line fibers, having a fractal dimension greater than one can result in behaving beyond fibrous members. Their efficiency was observed in interweaving and mechanical interlocking of discrete components to form a jamming structure. Using the G-B model, the higher friction coefficient was also obtained for the fibers recovered from spiral-shaped springs as compared to other temporary shapes (spring, disc, and zigzag-shaped springs), which is consistent with the surface roughness properties measured by optical profilometry. CT imaging was utilized to illustrate the formation mechanism of jamming structure. It was found that planar members were entangled and bridged the fracture opening. Subsequently, the fibrous members reinforced the formed bridge and reduced the porosity of netted blanket. Then, the granular members, which were programmed under compression, acted as the last step of hydraulic isolation by filling remained porous spaces.

Each of the following references is incorporated herein by reference in its entirety.

[1] Jaeger, H. M.; Nagel, S. R. 1996 Granular solids, liquids, and gases. *Reviews of Modern Physics* 68, 1259-1273.

[2] Song, C.; Wang, P.; Makse, H. A. 2008 A phase diagram for jammed matter. *Nature* 453, 629-32.

[3] Dierichs, K.; Menges, A. 2012 Aggregate Structures: Material and Machine Computation of Designed Granular Substances. *Architectural Design* 82, 74-81.

[4] Li, L.; Liu, Z.; Zhou, M.; Li, X.; Meng, Y.; Tian, Y. 2019 Flexible adhesion control by modulating backing stiffness based on jamming of granular materials. *Smart Mater. Struct.* 28, 115023.

[5] Aejmelaeus-Lindström, P.; Willmann, J.; Tibbits, S.; Gramazio, F.; Kohler, M. 2016 Jammed architectural structures: towards large-scale reversible Construction. *Granular Matter* 18, 28.

[6] Whitesides, G. M.; Grzybowski, B. 2002 Self-Assembly at All Scales. *Science* 295, 2418-2421.

[7] Bowden, N.; Oliver, S. R. J.; Whitesides, G. M. 2000 Mesoscale Self-Assembly: Capillary Bonds and Negative Menisci. *J. Phys. Chem. B* 104, 2714-2724.

[8] Boncheva, M.; Bruzewicz, D. A.; Whitesides, G. M. 2003 Millimeter-scale self-assembly and its applications, *Pure Appl. Chem.* 75, 621-630.

[9] Zhang, C.; Su, J.-W.; Deng, H.; Xie, Y.; Yan, Z.; Lin, J. 2017 Reversible Self-Assembly of 3D Architectures Actuated by Responsive Polymers. *ACS Appl. Mater. Interfaces* 9, 41505-41511.

[10] Lin, J.; Yuan, X.; Li, G.; Huang, Y.; Wang, W.; He, X.; Yu, C.; Fang, Y.; Liu, Z.; Tang, C. 2017 Self-Assembly of Porous Boron Nitride Mi crofibers into Ultralight Multifunctional Foams of Large Sizes. *ACS Appl. Mater. Interfaces* 9, 44732-44739.

[11] Lendlein, A.; Langer, R. 2002 Biodegradable, Elastic Shape-Memory Polymers for Potential Biomedical Applications. *Science* 296, 1673-1676.

[12] Lendlein, A.; Kelch, S. 2002 Shape-memory polymers. *Angew. Chem. Int. Ed.* 41, 2034-2057.

[13] Behl, M.; Lendlein, A. 2007 Shape-Memory polymers. *Materials Today* 10, 20-28.

[14] Ge, Q.; Dunn, C. K.; Qi, H. J.; Dunn, M. L. 2014 Active origami by 4D printing. *Smart Mater. Struct.* 23, 094007.

[15] Li, G.; Wang, A. 2016 Cold, Warm, and Hot Programming of Shape Memory Polymers. *Journal of Polymer Science* Part B: Polymer Physics 54, 1319-1339.

[16] Fan, J.; Li, G. 2018 High enthalpy storage thennoset network with giant stress and energy output in rubbery state. *Nature Communications* 9, 642.

[17] Lendlein, A.; Gould, O. E. C. 2019 Reprogrammable recovery and actuation behaviour of shape-memory polymers. *Nature Reviews Materials* 4, 116-133.

[18] Westbrook, K. K.; Mather, P. T.; Parakh, V.; Dunn, M. L.; Ge, Q.; Lee, B. M.; Qi, H. J. 2011 Two-way reversible shape memory effects in a free-standing polymer composite. *Smart Mater. Struct.* 20, 065010,

[19] Ge, Q.; Westbrook, K. K.; Mather, P. T.; Dunn, M. L.; Qi, H. J. 2013 Thermomechanical behavior of a two-way shape memory composite actuator. *Smart Mater. Struct.* 22, 055009.

[20] Liu, Y.; Gall, K.; Dunn, M.; Greenberg, A.; Diani, J. 2006 Thermo-mechanics of shape memory polymers: Uniaxial experiments and constitutive modeling. *International Journal of Plasticity* 22, 279-313.

[21] Rousseau, I. 2008 Challenges of shape memory polymers: A review of the progress toward overcoming SMP's limitations. *Polymer Engineering and Science* 48, 2075-2089.

[22] Campbell, D.; Barrett, R.; Lake, M. S.; Adams, L.; Abramson, E.; Scherbarth, MR.; Welsh, J. S.; Freebury, G.; Beidleman, N.; Abbot, J. Development of a novel, passively deployed roll-out solar array. *IEEE Aerospace Conference*, Big Sky, MT, 2006.

[23] Hussein, H.; Harrison, D. Investigation into the use of engineering polymers as actuators to produce 'automatic disassembly' of electronic products. In Design and Manufacture for Sustainable Development. In: Bhamra, T., and Hon, B., (eds.), Wiley-VCH: Weinheim, 2004.

[24] Li, G. Self-Healing Composites: Shape Memory Polymer Based Structures. John Wiley & Sons Inc.: West Sussex, U K, 2014.

[25] Wache, H. M.; Tartakowska, D. J.; lentrich, A.; Wagner, M. H. 2003 Development of a polymer stent with shape memory effect as a drug delivery system. *J. Mater. Sci.: Mater. Med.* 14, 109.

[26] Lu, L.; Li, G. 2016 One-Way Multishape-Memory Effect and Tunable Two-Way Shape Memory Effect of Ionomer Poly(ethylene-co-methacrylic acid). *ACS Appl. Mater. Interfaces* 8, 14812-14823.

[27] Dolog, R.; Weiss, R. A. 2017 Properties and shape-memory behavior of compounds of a poly(ethylene-co-methacrylic acid) ionomer and zinc stearate. *Polymer* 128, 128-134.

[28] Mansour, A.; Dahi Talegbani, A. 2018 Smart loss circulation materials for drilling highly fractured zones. SPE/LADC Middle East Drilling Technology Conference and Exhibition.

[29] MansourA Dahi Taleghani, A.; Salehi, S.; Li, G._Ezeakacha, C. 2019 Smart lost circulation materials for productive zones. *Journal of Petroleum Exploration and Production Technology* 9, 281-296.

[30] Lee, L.; Dahi Taleghani, A. 2020 Simulating Fracture Sealing by Granular LCM Particles in Geothermal Drilling. *Energies* 13, 4878.

[31] Choy, C.; Chen, F.; Young, K. 1981 Negative thermal expansion in oriented crystalline polymers. *J. Polym. Sci. Part B: Polym. Phys.* 19, 335-352.

[32] Bhushan, B. Surface Roughness Analysis and Measurement Techniques. CRC Press LLC, 2001.

[33] Ganti, S.; Bhushan, B. 1995 Generalized fractal analysis and its applications to engineering surfaces. *Wear* 180, 17-34.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the apparatus and methods of using and making the same disclosed herein have been discussed and illustrated, it is to be distinctly understood that the invention is not limited thereto but may be otherwise variously embodied and practiced within the scope of the following claims.

What is claimed is:

1. A lost circulation material, comprising:
a plurality of shape memory polymer members having a temporary shape and a permanent shape, wherein the plurality of shape memory polymer members are programmed to have the temporary shape through mechanical deformation,
wherein the plurality of shape memory polymer members are each configured to transform from the temporary shape to the permanent shape upon stimulation by an external trigger, and
wherein the plurality of shape memory polymer members comprise:
at least one shape memory polymer member with a granular permanent shape;
at least one shape memory polymer member with a fibrous permanent shape and a temporary shape selected from the group consisting of a spring, a zigzag-shaped spring, and a spiral-shaped spring; and
at least one shape memory polymer member with a planar permanent shape.

2. The lost circulation material of claim 1, wherein the external trigger is a temperature above the glass transition temperature of the plurality of shape memory polymer members.

3. The lost circulation material of claim 1, wherein the plurality of shape memory polymer members are one or more selected from the group consisting of an ionomer of poly (ethylene-co-methacrylic acid), a thermoset polymer, and a thermoplastic.

4. The lost circulation material of claim 1, wherein the temporary shape has at least one dimension that is smaller than at least one dimension of the permanent shape, and wherein the temporary shape has a dimension that is 20 mm or less.

5. The lost circulation material of claim 1, wherein the lost circulation material is configured to form a jamming structure when the at least one member transforms to the permanent shape, the jamming structure configured to plug a fracture having a width, wherein the width of the fracture is at least one order of magnitude larger than a dimension of the temporary shape.

6. The lost circulation material of claim 1, wherein at least a portion of the shape memory polymer members have a textured surface configured to increase surface friction between members.

7. The lost circulation material of claim 1, wherein the mechanical deformation is selected from the group consisting of rolling, spinning, folding, compressing, and providing tension.

8. The lost circulation material of claim 1, wherein the at least one shape memory polymer member with a fibrous permanent shape is configured to unfold and expand in multiple directions upon transformation from the temporary shape to the permanent shape.

9. The lost circulation material of claim 1, wherein the plurality of shape memory polymer members are configured such that upon transformation to their respective permanent shapes, the granular, fibrous, and planar members form an interlocked network capable of plugging fractures having a width of at least 12 mm.

10. The lost circulation material of claim 1, wherein the lost circulation material is positionable within a wellbore.

11. The lost circulation material of claim 10, wherein the lost circulation material is depositable on a fractured wellbore.

12. The lost circulation material of claim 10, wherein the lost circulation material is configured to seal a fracture within the wellbore.

* * * * *